(12) United States Patent
Sasaki et al.

(10) Patent No.: US 8,395,971 B2
(45) Date of Patent: Mar. 12, 2013

(54) HEAT-ASSISTED MAGNETIC RECORDING HEAD WITH LASER DIODE FIXED TO SLIDER

(75) Inventors: Yoshitaka Sasaki, Milpitas, CA (US); Hiroyuki Ito, Milpitas, CA (US); Shigeki Tanemura, Milpitas, CA (US); Hironori Araki, Milpitas, CA (US)

(73) Assignee: Headway Technologies, Inc., Milpitas ( * ) Notice: Subject to any disclaimer, the term of this patent is extended or adjusted under 35 U.S.C. 154(b) by 718 days.

(21) Appl. No.: 12/458,546

(22) Filed: Jul. 15, 2009

(65) Prior Publication Data

US 2011/0013497 A1    Jan. 20, 2011

(51) Int. Cl.
*G11B 11/00* (2006.01)
(52) U.S. Cl. .................................................. 369/13.02
(58) Field of Classification Search .................. None
See application file for complete search history.

(56) References Cited

U.S. PATENT DOCUMENTS

| | | | |
|---|---|---|---|
| 6,649,894 B2 | 11/2003 | Matsumoto et al. |
| 7,911,883 B2 | 3/2011 | Sasaki et al. |
| 8,000,175 B2 | 8/2011 | Shimazawa et al. |
| 2001/0017820 A1 | 8/2001 | Akiyama et al. |
| 2005/0254355 A1 | 11/2005 | Rettner et al. |
| 2006/0233062 A1 | 10/2006 | Bedillion et al. |
| 2007/0159720 A1 | 7/2007 | Sohn et al. |
| 2007/0165494 A1 | 7/2007 | Cho et al. |
| 2007/0177302 A1 | 8/2007 | Shimazawa et al. |
| 2008/0002298 A1 | 1/2008 | Sluzewski |
| 2008/0055762 A1 | 3/2008 | Shimazawa et al. |
| 2008/0056073 A1 | 3/2008 | Shimizu |
| 2008/0316872 A1 | 12/2008 | Shimizu et al. |
| 2009/0303858 A1 | 12/2009 | Kuiseko et al. |
| 2010/0061200 A1 | 3/2010 | Shimazawa et al. |

(Continued)

FOREIGN PATENT DOCUMENTS

| | | |
|---|---|---|
| JP | A-2003-114184 | 4/2003 |
| JP | A-2005-004901 | 1/2005 |

(Continued)

OTHER PUBLICATIONS

Oct. 5, 2011 Office Action issued in U.S. Appl. No. 12/727,620.

(Continued)

*Primary Examiner* — Joseph Feild
*Assistant Examiner* — Henok Heyi
(74) *Attorney, Agent, or Firm* — Oliff and Berridge

(57) ABSTRACT

A heat-assisted magnetic recording head includes a slider, an edge-emitting laser diode fixed to the slider, and an external mirror provided outside the slider. The slider includes a magnetic pole, a waveguide, a near-field light generating element, and a substrate. The substrate has a top surface facing toward the magnetic pole, the near-field light generating element and the waveguide. The slider has a top surface that lies above the top surface of the substrate, at an end of the slider farther from the top surface of the substrate. The laser diode includes: an active layer; an emitting end face that lies at an end in a direction parallel to the plane of the active layer and includes an emission part for emitting laser light; and a bottom surface that lies at an end in a direction perpendicular to the plane of the active layer. The laser diode is arranged so that the bottom surface faces the top surface of the slider. The external mirror reflects the laser light emitted from the emission part toward the waveguide.

10 Claims, 27 Drawing Sheets

U.S. PATENT DOCUMENTS

| | | | |
|---|---|---|---|
| 2010/0073802 A1 | 3/2010 | Komura et al. | |
| 2010/0118431 A1 | 5/2010 | Tomikawa et al. | |
| 2010/0123967 A1* | 5/2010 | Batra et al. | 360/59 |
| 2010/0165801 A1 | 7/2010 | Boone et al. | |
| 2010/0172220 A1 | 7/2010 | Komura et al. | |
| 2010/0195238 A1 | 8/2010 | Shimazawa et al. | |
| 2010/0202081 A1 | 8/2010 | Shimazawa et al. | |
| 2010/0214684 A1* | 8/2010 | Gao et al. | 360/59 |
| 2010/0238580 A1* | 9/2010 | Shimazawa et al. | 360/59 |
| 2010/0260015 A1* | 10/2010 | Sasaki et al. | 369/13.02 |
| 2010/0290323 A1 | 11/2010 | Isogai et al. | |
| 2010/0315736 A1* | 12/2010 | Takayama et al. | 360/59 |
| 2010/0328806 A1* | 12/2010 | Sasaki et al. | 360/59 |
| 2011/0013497 A1 | 1/2011 | Sasaki et al. | |
| 2011/0026377 A1 | 2/2011 | Shimazawa et al. | |
| 2011/0058273 A1* | 3/2011 | Sasaki et al. | 360/59 |
| 2011/0096435 A1* | 4/2011 | Sasaki et al. | 360/114.01 |
| 2011/0096639 A1 | 4/2011 | Matsumoto | |
| 2011/0141861 A1 | 6/2011 | Hirata et al. | |
| 2011/0149426 A1* | 6/2011 | Araki et al. | 360/59 |
| 2011/0188354 A1* | 8/2011 | Sasaki et al. | 369/13.32 |
| 2011/0228417 A1 | 9/2011 | Sasaki et al. | |
| 2011/0228649 A1* | 9/2011 | Shimazawa et al. | 369/13.24 |
| 2011/0228653 A1* | 9/2011 | Shimazawa et al. | 369/13.32 |

FOREIGN PATENT DOCUMENTS

| | | |
|---|---|---|
| JP | A-2007-188619 | 7/2007 |
| JP | A-2007-207349 | 8/2007 |
| JP | A-2007-257753 | 10/2007 |
| JP | A-2008-016096 | 1/2008 |
| JP | A-2008-059693 | 3/2008 |
| JP | A-2008-257819 | 10/2008 |
| JP | A-2009-004030 | 1/2009 |
| JP | A-2009-087499 | 4/2009 |
| WO | WO 2007/132766 A1 | 11/2007 |
| WO | WO 2009/008488 A1 | 1/2009 |

OTHER PUBLICATIONS

May 27, 2011 Office Action issued in U.S. Appl. No. 12/385,447.
Oct. 5, 2011 Office Action issued in U.S. Appl. No. 12/727,666.
Yoshitaka Sasaki et al., U.S. Appl. No. 12/385,447, filed Apr. 8, 2009.
Yoshitaka Sasaki et al., U.S. Appl. No. 12/457,984, filed Jun. 26, 2009.
Yoshitaka Sasaki et al., U.S. Appl. No. 12/585,150, filed Sep. 4, 2009.
Yoshitaka Sasaki et al., U.S. Appl. No. 12/714,998, filed Mar. 1, 2010.
Yoshitaka Sasaki et al., U.S. Appl. No. 12/727,666, filed Mar. 19, 2010.
Yoshitaka Sasaki et al., U.S. Appl. No. 12/727,620, filed Mar. 19, 2010.
Challener W.A., et al. "Heat-Assisted Magnetic Recording by a Near-Field Transducer with Efficient Optical Energy Transfer," Nature Photonics, Mar. 2009, pp. 1-5, Seagate Technology, Pittsburgh, PA.
Office Action dated Oct. 29, 2012 issued in U.S. Appl. No. 12/585,150.
Office Action dated Jan. 8, 2013 issued in Japanese Patent Application No. 2010-019274 (with translation).

* cited by examiner

HEAT-ASSISTED MAGNETIC RECORDING HEAD WITH LASER DIODE FIXED TO SLIDER

BACKGROUND OF THE INVENTION

1. Field of the Invention

The present invention relates to a heat-assisted magnetic recording head for use in heat-assisted magnetic recording wherein data recording is performed with a recording medium with its coercivity lowered by irradiating the recording medium with near-field light.

2. Description of the Related Art

Recently, magnetic recording devices such as a magnetic disk drive have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a reproducing head including a magnetoresistive element (hereinafter, also referred to as MR element) for reading and a recording head including an induction-type electromagnetic transducer for writing are stacked on a substrate. In a magnetic disk drive, the thin-film magnetic head is mounted on a slider which flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data recording with existing magnetic heads.

To solve the foregoing problems, there has been proposed a method so-called heat-assisted magnetic recording. This method uses a recording medium having high coercivity. When recording data, a magnetic field and heat are simultaneously applied to the area of the recording medium where to record data, so that the area rises in temperature and drops in coercivity for data recording. The area where data is recorded subsequently falls in temperature and rises in coercivity to increase the thermal stability of magnetization.

In heat-assisted magnetic recording, near-field light is typically used as a means for applying heat to the recording medium. A known method for generating near-field light is to irradiate a plasmon antenna, which is a small piece of metal, with laser light. The plasmon antenna has a near-field light generating part which is a sharp-pointed part for generating near-field light. The laser light applied to the plasmon antenna excites surface plasmons on the plasmon antenna. The surface plasmons propagate to the near-field light generating part of the plasmon antenna, and the near-field light generating part generates near-field light based on the surface plasmons. The near-field light generated by the plasmon antenna exists only within an area smaller than the diffraction limit of light. Irradiating the recording medium with the near-field light makes it possible to heat only a small area of the recording medium.

In general, the laser light to be used for generating the near-field light is guided through a waveguide that is provided in the slider to the plasmon antenna that is located near the medium facing surface of the slider. Possible techniques of placement of a light source that emits the laser light are broadly classified into the following two. A first technique is to place the light source away from the slider. A second technique is to fix the light source to the slider.

The first technique is described in U.S. Patent Application Publication No. 2006/0233062 A1, for example. The second technique is described in U.S. Patent Application Publication No. 2008/0055762 A1 and U.S. Patent Application Publication No. 2008/0002298 A1, for example.

The first technique requires an optical path of extended length including such optical elements as a mirror, lens, and optical fiber in order to guide the light from the light source to the waveguide. This causes the problem of increasing energy loss of the light in the path. The second technique is free from the foregoing problem since the optical path for guiding the light from the light source to the waveguide is short.

The second technique, however, has the following problem. Hereinafter, the problem that can occur with the second technique will be described in detail. The second technique typically uses a laser diode as the light source. The laser diodes available include edge-emitting laser diodes and surface-emitting laser diodes. In an edge-emitting laser diode, the emission part for emitting the laser light is located in an end face that lies at an end of the laser diode in a direction parallel to the plane of an active layer. The emission part emits the laser light in the direction parallel to the plane of the active layer. In a surface-emitting laser diode, the emission part for emitting the laser light is located in a surface that lies at an end of the laser diode in a direction perpendicular to the plane of the active layer. The emission part emits the laser light in the direction perpendicular to the plane of the active layer.

The laser light emitted from a laser diode can be made incident on the waveguide by a technique described in U.S. Patent Application Publication No. 2008/0055762 A1, for example. This publication describes arranging an edge-emitting laser diode with its emission part opposed to the incident end of the waveguide so that the laser light emitted from the emission part is incident on the incident end of the waveguide without the intervention of any optical element. According to this technique, the laser diode is arranged so that the longitudinal direction of the laser diode, i.e., the direction of the optical axis of the laser light to be emitted from the emission part, is perpendicular to the end face of the slider where the incident end of the waveguide is located. In such a case, the laser diode needs to be positioned with high precision so that the optical axis of the laser light emitted from the emission part will not tilt with respect to the optical axis of the waveguide. If the optical axis of the laser light emitted from the emission part tilts with respect to the optical axis of the waveguide, the laser light may fail to be delivered to the plasmon antenna with sufficient intensity. When the laser diode is to be arranged so that the longitudinal direction of the laser diode is perpendicular to the end face of the slider where the incident end of the waveguide is located, however, there is a problem that the longitudinal direction of the laser diode can easily tilt with respect to the direction perpendicular to the end face of the slider where the incident end of the waveguide is located, and it is thus difficult to align the laser light with the waveguide.

The laser light emitted from a laser diode may be made incident on the waveguide by other techniques. For example, as described in U.S. Patent Application Publication No. 2008/0002298 A1, a surface-emitting laser diode may be arranged with its emission part opposed to the surface of the slider on the trailing side so that the laser light emitted from the emission part is incident on the waveguide from above. This technique facilitates aligning the laser light with the waveguide. Surface-emitting laser diodes, however, typically have a lower optical output as compared with edge-emitting laser diodes. The technique therefore has the problem that it is difficult to provide laser light of sufficiently high intensity for use in generating the near-field light.

OBJECT AND SUMMARY OF THE INVENTION

It is an object of the present invention to provide a heat-assisted magnetic recording head that allows easy alignment of laser light with the waveguide while using an edge-emitting laser diode as the light source for emitting light that is used for generating near-field light.

A heat-assisted magnetic recording head of the present invention includes a slider, an edge-emitting laser diode fixed to the slider, and an external mirror provided outside the slider.

The slider includes: a medium facing surface that faces a recording medium; a magnetic pole that has an end face located in the medium facing surface, for producing a recording magnetic field for recording data on the recording medium; a waveguide that allows light to propagate therethrough; a near-field light generating element having a near-field light generating part located in the medium facing surface, a surface plasmon being excited based on the light propagating through the waveguide, the surface plasmon propagating to the near-field light generating part, the near-field light generating part generating near-field light based on the surface plasmon; and a substrate on which the magnetic pole, the near-field light generating element and the waveguide are stacked.

The substrate has a top surface facing toward the magnetic pole, the near-field light generating element, and the waveguide. The slider has a top surface that lies above the top surface of the substrate, at an end of the slider farther from the top surface of the substrate. The laser diode includes: an active layer; an emitting end face that lies at an end in a direction parallel to a plane of the active layer and includes an emission part for emitting laser light; and a bottom surface that lies at an end in a direction perpendicular to the plane of the active layer. The laser diode is arranged so that the bottom surface faces the top surface of the slider. The external mirror reflects the laser light emitted from the emission part toward the waveguide. As employed herein, the direction of travel of the laser light refers to the direction of travel at the center of the laser beam. Where the components of the heat-assisted magnetic recording head excluding the substrate are concerned in the present application, a surface closer to the top surface of the substrate will be defined as "bottom surface," and a surface farther from the top surface of the substrate will be defined as "top surface."

In the heat-assisted magnetic recording head of the present invention, the near-field light generating element and the waveguide may be disposed farther from the top surface of the substrate than is the magnetic pole. In this case, the waveguide may be disposed farther from the top surface of the substrate than is the near-field light generating element.

In the heat-assisted magnetic recording head of the present invention, the near-field light generating element may have an outer surface that includes: a first end face that is located in the medium facing surface; a second end face that is farther from the medium facing surface; and a coupling portion that couples the first end face and the second end face to each other. The first end face may include the near-field light generating part. In this case, a length of the near-field light generating element in a direction perpendicular to the medium facing surface may be greater than a length of the first end face in a direction perpendicular to the top surface of the substrate, and the waveguide may have an outer surface including an opposed portion that is opposed to a part of the coupling portion. In this case, the slider may further include an interposition layer that has a refractive index lower than that of the waveguide and is interposed between the opposed portion and the near-field light generating element.

In the heat-assisted magnetic recording head of the present invention, the slider may further include an internal mirror that reflects the laser light emitted from the emission part and reflected by the external mirror, so as to let the laser light travel through the waveguide toward the medium facing surface. Here, the laser diode, the external mirror, the internal mirror and the waveguide may be arranged so that the direction of travel of the laser light emitted from the emission part and the direction of travel of the laser light reflected by the internal mirror are orthogonal to each other as viewed from above the top surface of the slider. Alternatively, the laser diode, the external mirror, the internal mirror and the waveguide may be arranged so that the direction of travel of the laser light emitted from the emission part and the direction of travel of the laser light reflected by the internal mirror are parallel to each other.

In the heat-assisted magnetic recording head of the present invention, the waveguide may have an incident end face on which the laser light reflected by the external mirror is to be incident.

In the heat-assisted magnetic recording head of the present invention, the laser diode may have a top surface opposite to the bottom surface, and the distance between the bottom surface and the emission part may be smaller than the distance between the top surface of the laser diode and the emission part.

In the heat-assisted magnetic recording head of the present invention, the edge-emitting laser diode is fixed to the slider such that its bottom surface lying at the end in the direction perpendicular to the plane of the active layer faces the top surface of the slider. This can prevent the optical axis of the laser light emitted from the emission part from tilting with respect to a desired direction. In the present invention, the laser light emitted from the emission part is reflected by the external mirror toward the waveguide. According to the present invention, it is thus possible, while using the edge-emitting laser diode as the light source for emitting light to be used for generating near-field light, to align the laser light with the waveguide easily as compared with the case where the laser light emitted from the emission part is made incident directly on the waveguide.

Other and further objects, features and advantages of the present invention will appear more fully from the following description.

DETAILED DESCRIPTION OF THE PREFERRED EMBODIMENTS

First Embodiment

Figure 4:
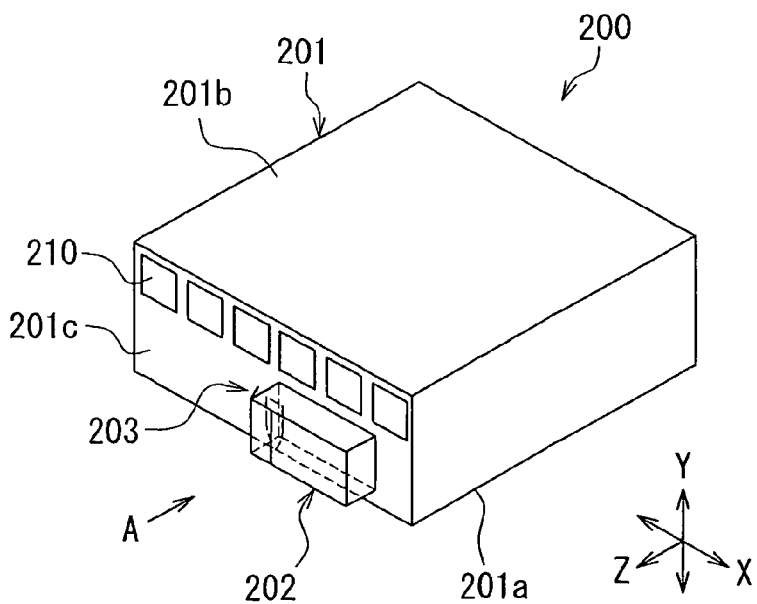
FIG. 4 is a perspective view of the heat-assisted magnetic recording head according to the first embodiment of the invention.
Figure 5:
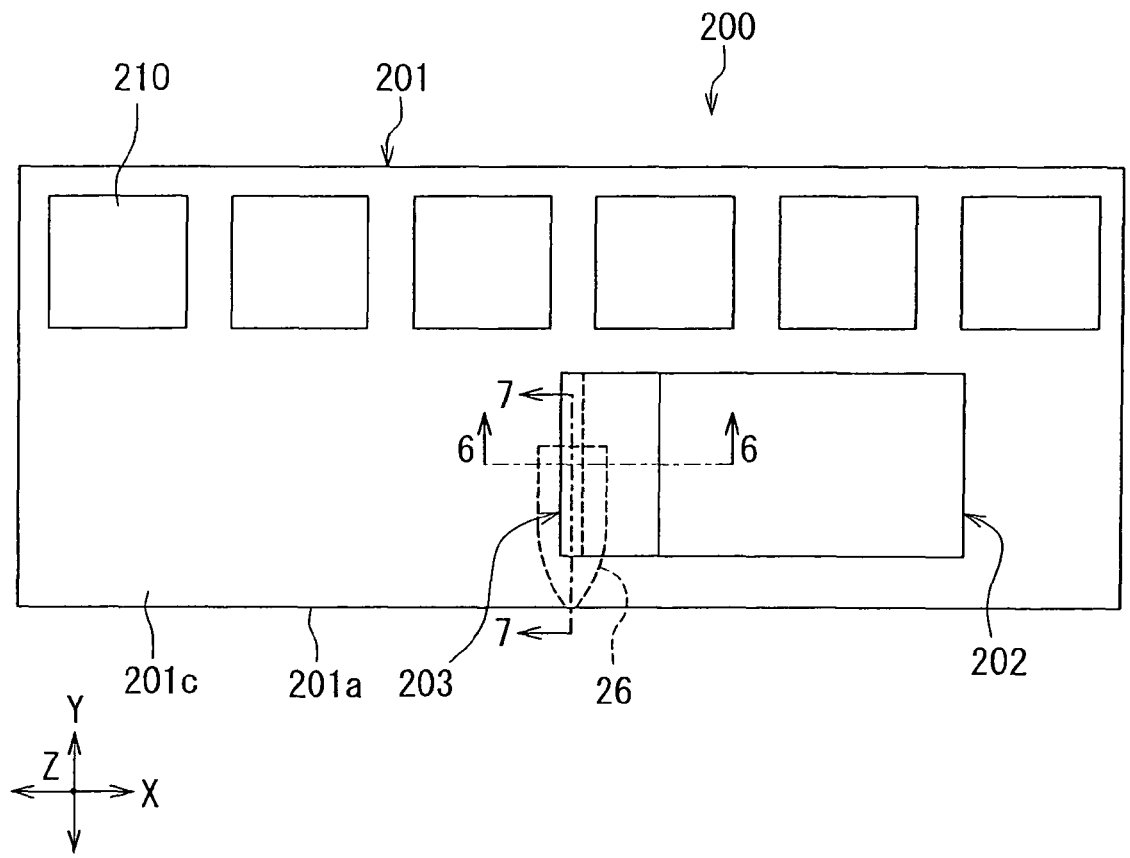
FIG. 5 is a plan view showing the heat-assisted magnetic recording head as viewed from the direction A of FIG. 4.

Preferred embodiments of the present invention will now be described in detail with reference to the drawings. Reference is first made to FIG. 4 and FIG. 5 to describe a heat-assisted magnetic recording head and a magnetic disk drive according to a first embodiment of the invention. FIG. 4 is a perspective view of the heat-assisted magnetic recording head according to the present embodiment. FIG. 5 is a plan view of the heat-assisted magnetic recording head as viewed from the direction A of FIG. 4.

The magnetic disk drive of the present embodiment incorporates the heat-assisted magnetic recording head 200 according to the present embodiment. The heat-assisted magnetic recording head 200 is supported by a not-shown suspension and is disposed to face a circular-plate-shaped recording medium (magnetic disk) that is driven to rotate. In FIG. 4 and FIG. 5 the X direction is a direction across the tracks of the recording medium, the Y direction is a direction perpendicular to the surface of the recording medium, and the Z direction is the direction of travel of the recording medium as viewed from the heat-assisted magnetic recording head 200. The X direction, the Y direction and the Z direction are orthogonal to one another.

The heat-assisted magnetic recording head 200 includes a slider 201, an edge-emitting laser diode 202 fixed to the slider 201, and an external mirror 203 provided outside the slider 201. The slider 201 is nearly hexahedron-shaped, and has a medium facing surface 201a that faces the recording medium, a rear surface 201b opposite to the medium facing surface 201a, and four surfaces that couple the medium facing surface 201a to the rear surface 201b. One of the four surfaces that couple the medium facing surface 201a to the rear surface 201b is a top surface 201c to which the laser diode 202 is fixed. The slider 201 has a plurality of terminals 210 provided on the top surface 201c. In the present embodiment, the external mirror 203 is fixed to the laser diode 202.

When the recording medium rotates and travels in the Z direction, an airflow passing between the recording medium and the slider 201 generates a lift on the upper side in the Y direction of FIG. 4, and the lift is exerted on the slider 201. The lift causes the slider 201 to slightly fly over the surface of the recording medium.

Figure 1:
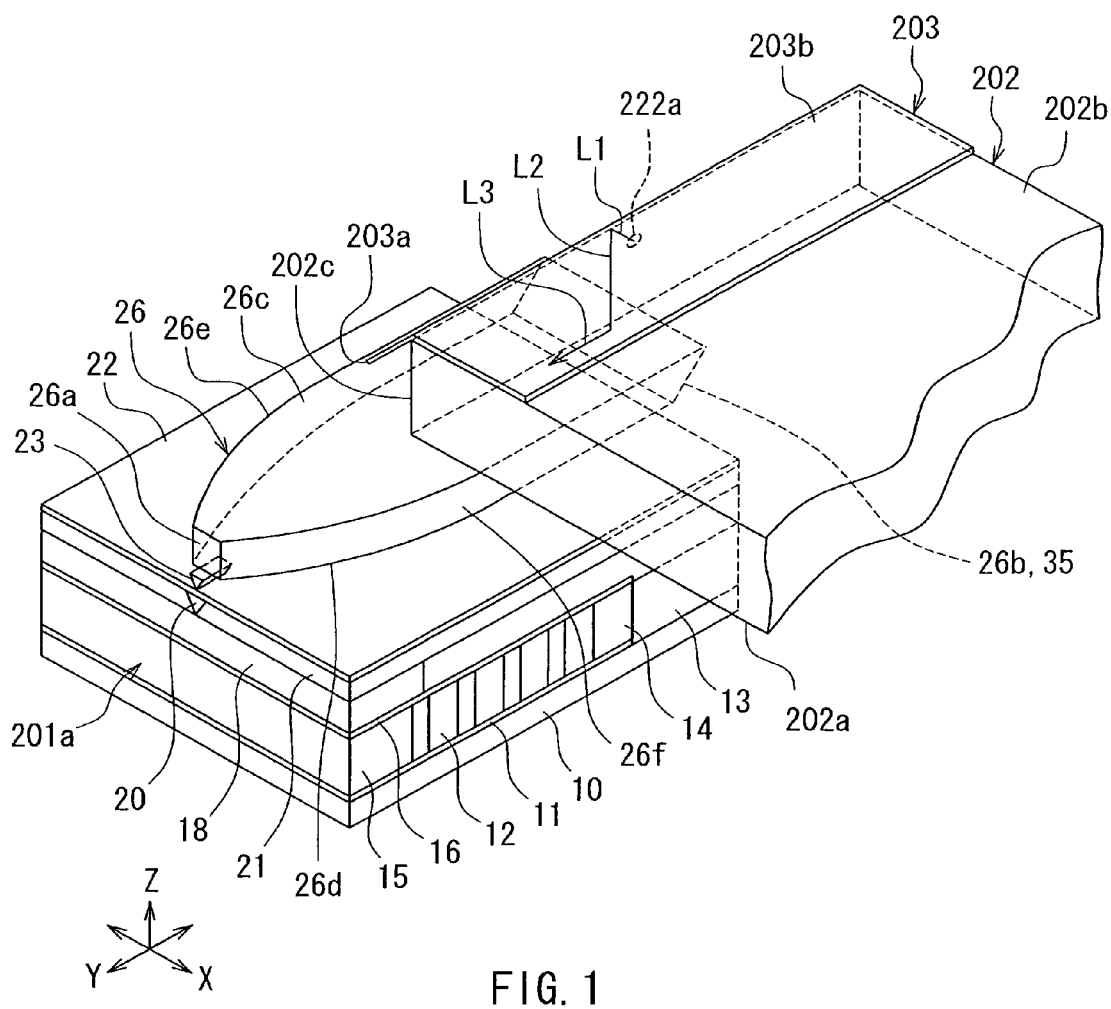
FIG. 1 is a perspective view showing the main part of a heat-assisted magnetic recording head according to a first embodiment of the invention.
Figure 7:
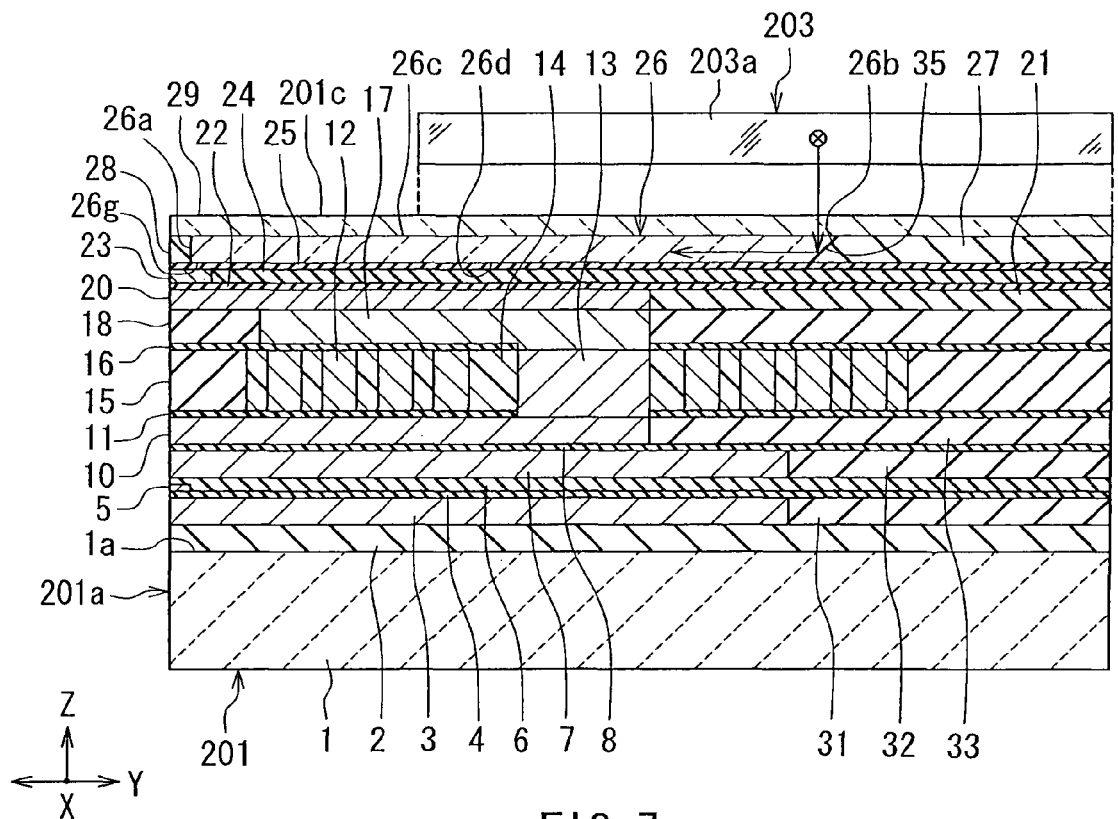
FIG. 7 is a cross-sectional view showing the configuration of a slider of the first embodiment of the invention.
Figure 8:
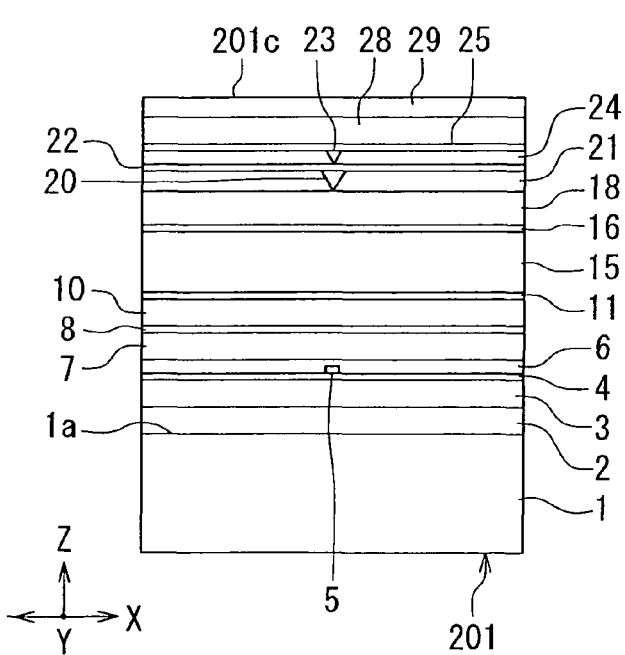
FIG. 8 is a front view showing the medium facing surface of the slider of the first embodiment of the invention.
Figure 9:
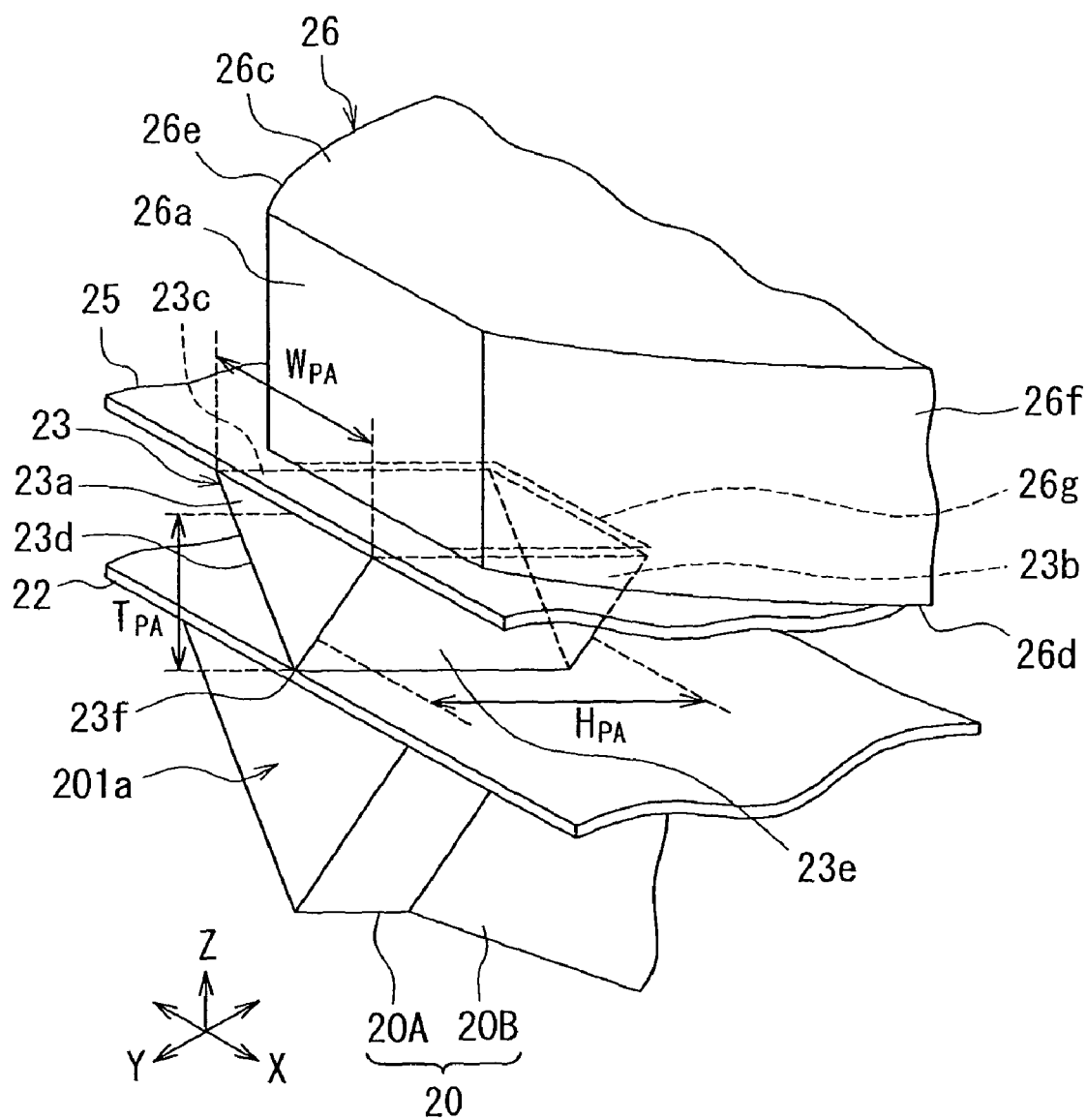
FIG. 9 is a perspective view showing a near-field light generating element and its vicinity in the heat-assisted magnetic recording head according to the first embodiment of the invention.

Reference is now made to FIG. 1, and FIG. 7 to FIG. 9 to describe the configuration of the slider 201 in detail. FIG. 1 is a perspective view showing the main part of the heat-assisted magnetic recording head 200 according to the present embodiment. FIG. 7 is a cross-sectional view showing the configuration of the slider 201. FIG. 7 shows a cross section taken along line 7-7 of FIG. 5. FIG. 8 is a front view showing the medium facing surface 201a of the slider 201. FIG. 9 is a perspective view showing a near-field light generating element and its vicinity in the heat-assisted magnetic recording head 200. The X, Y and Z directions shown in FIG. 4 are also shown in FIG. 1, and FIG. 7 to FIG. 9. In FIG. 7 the X direction is orthogonal to the Y and Z directions. In FIG. 8 the Y direction is orthogonal to the X and Z directions.

As shown in FIG. 7 and FIG. 8, the slider 201 includes: a substrate 1 made of a ceramic material such as aluminum oxide-titanium carbide ($Al_2O_3.TiC$) and having a top surface 1a; an insulating layer 2 made of an insulating material and disposed on the top surface 1a of the substrate 1; a bottom shield layer 3 made of a magnetic material and disposed on the insulating layer 2; and an insulating layer 31 made of an insulating material and disposed around the bottom shield layer 3 on the insulating layer 2. The insulating layers 2 and 31 are made of alumina ($Al_2O_3$), for example. The bottom shield layer 3 and the insulating layer 31 are flattened at the top.

The slider 201 further includes: a bottom shield gap film 4 which is an insulating film disposed over the top surfaces of the bottom shield layer 3 and the insulating layer 31; a magnetoresistive (MR) element 5 as a read element disposed on the bottom shield gap film 4; a top shield gap film 6 which is an insulating film disposed on the MR element 5; a top shield layer 7 made of a magnetic material and disposed on the top shield gap film 6; and an insulating layer 32 made of an insulating material and disposed around the top shield layer 7 on the top shield gap film 6. The insulating layer 32 is made of alumina, for example. The top shield layer 7 and the insulating layer 32 are flattened at the top.

An end of the MR element 5 is located in the medium facing surface 201a. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction nearly parallel to the plane of layers constituting the GMR element or the current-perpendicular-to-plane (CPP) type in which the current used for detecting magnetic signals is fed in a direction nearly perpendicular to the plane of layers constituting the GMR element. The parts from the bottom shield layer 3 to the top shield layer 7 constitute a reproducing head.

The slider 201 further includes: a nonmagnetic layer 8 made of a nonmagnetic material and disposed over the top surfaces of the top shield layer 7 and the insulating layer 32; a return magnetic pole layer 10 made of a magnetic material and disposed on the nonmagnetic layer 8; and an insulating layer 33 made of an insulating material and disposed around the return magnetic pole layer 10 on the nonmagnetic layer 8. The nonmagnetic layer 8 and the insulating layer 33 are made of alumina, for example. The return magnetic pole layer 10 and the insulating layer 33 are flattened at the top.

The slider 201 further includes: an insulating layer 11 disposed on part of the top surfaces of the return magnetic pole layer 10 and the insulating layer 33; a coil 12 disposed on the insulating layer 11; and a coupling layer 13 disposed on the return magnetic pole layer 10. The return magnetic pole layer 10 and the coupling layer 13 are each made of a magnetic material. The material of the return magnetic pole layer 10 and the coupling layer 13 may be CoFeN, CoNiFe, NiFe or CoFe, for example. The insulating layer 11 is made of alumina, for example. The coil 12 produces a magnetic field corresponding to data to be recorded on the recording medium. The coil 12 is planar spiral-shaped and wound around the coupling layer 13. The coil 12 is made of a conductive material such as copper.

The slider 201 further includes: an insulating layer 14 made of an insulating material and disposed around the coil 12 and in the space between every adjacent turns of the coil 12; an insulating layer 15 disposed around the insulating layer 14 and the coupling layer 13 on the insulating layer 11; and an insulating layer 16 disposed on the coil 12 and the insulating layers 14 and 15. The coil 12, the coupling layer 13 and the insulating layers 14 and 15 are flattened at the top. The insulating layer 14 is made of photoresist, for example. The insulating layers 15 and 16 are made of alumina, for example.

The slider 201 further includes: a bottom yoke layer 17 made of a magnetic material and disposed over the coupling layer 13 and the insulating layer 16; and a nonmagnetic layer 18 made of a nonmagnetic material and disposed around the bottom yoke layer 17 on the insulating layer 16. The material of the bottom yoke layer 17 may be CoFeN, CoNiFe, NiFe or CoFe, for example. The nonmagnetic layer 18 is made of alumina, for example. The bottom yoke layer 17 has an end face that is closer to the medium facing surface 201a, and this end face is located at a distance from the medium facing surface 201a. The bottom yoke layer 17 and the nonmagnetic layer 18 are flattened at the top.

The slider 201 further includes: a magnetic pole 20 disposed over the bottom yoke layer 17 and the nonmagnetic layer 18; and a nonmagnetic layer 21 made of a nonmagnetic material and disposed around the magnetic pole 20 on the nonmagnetic layer 18. The magnetic pole 20 has an end face located in the medium facing surface 201a. The magnetic pole 20 passes a magnetic flux corresponding to the magnetic field produced by the coil 12, and produces a recording magnetic field for recording data on the recording medium by means of a perpendicular magnetic recording system. The magnetic pole 20 is made of a magnetic metal material. The material of the magnetic pole 20 may be NiFe, CoNiFe or CoFe, for example. The nonmagnetic layer 21 is made of alumina, for example. The magnetic pole 20 and the nonmagnetic layer 21 are flattened at the top.

As shown in FIG. 9, the magnetic pole 20 includes a track width defining portion 20A and a wide portion 20B. The track width defining portion 20A has an end face located in the medium facing surface 201a and an end opposite thereto. The wide portion 20B is connected to the end of the track width defining portion 20A and has a width greater than that of the track width defining portion 20A. The width of the track width defining portion 20A does not change with the distance from the medium facing surface 201a. For example, the wide portion 20B is equal in width to the track width defining portion 20A at the boundary with the track width defining portion 20A, and gradually increases in width with increasing distance from the medium facing surface 201a and then maintains a specific width to the end of the wide portion 20B. In the example shown in FIG. 8 to FIG. 9, the end face of the track width defining portion 20A located in the medium facing surface 201a is shaped like an isosceles triangle with its vertex downward. However, the end face of the track width defining portion 20A located in the medium facing surface 201a may have a rectangular or trapezoidal shape.

The slider 201 further includes an insulating layer 22 disposed over the top surfaces of the magnetic pole 20 and the nonmagnetic layer 21. The insulating layer 22 is made of alumina, for example. The insulating layer 22 has a thickness within the range of 30 to 70 nm, for example.

The slider 201 further includes: a near-field light generating element 23 disposed on the insulating layer 22; and an insulating layer 24 made of an insulating material and disposed around the near-field light generating element 23 on the insulating layer 22. The near-field light generating element 23 and the insulating layer 24 are flattened at the top. The near-field light generating element 23 is made of a metal. Specifically, the near-field light generating element 23 is made of one of Au, Ag, Al, Cu, Pd, Pt, Rh and Ir, or of an alloy composed of two or more of these elements. The insulating layer 24 is made of alumina, for example.

As shown in FIG. 9, the near-field light generating element 23 has a near-field light generating part 23f located in the medium facing surface 201a. The near-field light generating element 23 is shaped like a triangular prism, having an outer surface described below. The outer surface of the near-field light generating element 23 includes: a first end face 23a that is located in the medium facing surface 201a; a second end face 23b that is spaced from the medium facing surface 201a; and a coupling portion that couples the first end face 23a and the second end face 23b to each other. The coupling portion includes a top surface 23c that is spaced from the top surface 1a of the substrate 1, and two side surfaces 23d and 23e that decrease in distance from each other with decreasing distance to the top surface 1a of the substrate 1. The first end face 23a is shaped like an isosceles triangle with the vertex downward. The first end face 23a includes the near-field light generating part 23f. Specifically, the near-field light generating part 23f refers to the downward vertex of the end face 23a and its vicinity.

As shown in FIG. 9, the length of the near-field light generating element 23 in the direction perpendicular to the medium facing surface 201a will be denoted by the symbol $H_{P4}$; the width of the first end face 23a at its top edge will be denoted by the symbol $W_{P4}$; and the length of the first end face 23a in the direction perpendicular to the top surface 1a of the substrate 1 will be denoted by the symbol $T_{P4}$. The length $H_{P4}$ of the near-field light generating element 23 in the direction perpendicular to the medium facing surface 201a is greater than the length $T_{P4}$ of the first end face 23a in the direction perpendicular to the top surface 1a of the substrate 1. Both of $W_{P4}$ and $T_{P4}$ are smaller than or equal to the wavelength of light that propagates through a waveguide to be described later. $W_{P4}$ falls within the range of 50 to 150 nm, for example. $T_{P4}$ falls within the range of 50 to 150 nm, for example. $H_{P4}$ falls within the range of 0.25 to 2.5 μm, for example.

The slider 201 further includes: an interposition layer 25 disposed over the top surfaces of the near-field light generating element 23 and the insulating layer 24; and a waveguide 26 and clad layers 27 and 28 disposed on the interposition layer 25. The waveguide 26 is made of a dielectric material that transmits laser light to be described later. The interposition layer 25 is made of a dielectric material that has a refractive index lower than that of the waveguide 26 and transmits the laser light. The clad layers 27 and 28 are made of a dielectric material that has a refractive index lower than that of the waveguide 26. For example, the waveguide 26 may be made of $Ta_2O_5$ which has a refractive index of approximately 2.1, and the interposition layer 25 and the clad layers 27 and 28 may be made of alumina which has a refractive index of approximately 1.8. The interposition layer 25 has a thickness within the range of 30 to 70 nm, for example.

As shown in FIG. 1, FIG. 5 and FIG. 7, the waveguide 26 extends in the direction perpendicular to the medium facing surface 201a (the Y direction). The waveguide 26 has an outer surface. The outer surface includes: a front end face 26a that is closer to the medium facing surface 201a; a rear end face 26b that is farther from the medium facing surface 201a; a top surface 26c that is farther from the top surface 1a of the substrate 1; a bottom surface 26d that is closer to the top surface 1a of the substrate 1; and two side surfaces 26e and 26f that are opposite to each other in the track width direction. FIG. 1 shows an example in which the front end face 26a is located away from the medium facing surface 201a. The front end face 26a may be located in the medium facing surface 201a, however. The clad layer 27 is located farther from the medium facing surface 201a than is the rear end face 26b. The clad layer 28 is disposed around the waveguide 26 and the clad layer 27. The waveguide 26 and the clad layers 27 and 28 are flattened at the top.

The outer surface of the waveguide 26 includes an opposed portion 26g that is opposed to a part of the coupling portion of the outer surface of the near-field light generating element 23. In the present embodiment, as shown in FIG. 7, the waveguide 26 is disposed farther from the top surface 1a of the substrate 1 than is the near-field light generating element 23, and a part of the bottom surface 26d of the waveguide 26 is opposed to a part of the top surface 23c of the near-field light generating element 23 with the interposition layer 25 interposed therebetween. This part of the bottom surface 26d of the waveguide 26 opposed to the part of the top surface 23c is the opposed portion 26g. The previously-mentioned configuration that the length $H_{P4}$ of the near-field light generating element 23 in the direction perpendicular to the medium facing surface 201a is greater than the length $T_{P4}$ of the first end face 23a in the direction perpendicular to the top surface 1a of the substrate 1 is necessary in order that the opposed portion 26g, which is a part of the bottom surface 26d of the waveguide 26, is opposed to a part of the top surface 23c of the near-field light generating element 23 with the interposition layer 25 interposed therebetween.

As shown in FIG. 7, the rear end face 26b is an oblique surface inclined at an angle of 45° with respect to the direction perpendicular to the top surface 1a of the substrate 1. The distance between the medium facing surface 201a and an arbitrary point on the rear end face 26b increases with increasing distance between the arbitrary point and the top surface 1a of the substrate 1.

The slider 201 further includes an internal mirror 35 disposed between the waveguide 26 and the clad layer 27 so as to be in contact with the rear end face 26b of the waveguide 26. The internal mirror 35 is made of a film of a metal such as Cu or Au having a thickness of 50 to 200 nm or so. The internal mirror 35 is configured to reflect light emitted from the light source disposed above the waveguide 26, so as to let the light travel through the waveguide 26 toward the medium facing surface 201a. More specifically, the internal mirror 35 is configured to reflect light that enters the waveguide 26 from the top surface 26c of the waveguide 26 and reaches the rear end face 26b, so as to let the light travel toward the front end face 26a.

The slider 201 further includes a clad layer 29 disposed over the top surfaces of the waveguide 26 and the clad layers 27 and 28. The clad layer 29 is made of a dielectric material that has a refractive index lower than that of the waveguide 26 and transmits laser light. For example, if the waveguide 26 is made of $Ta_2O_5$ which has a refractive index of approximately 2.1, the clad layer 29 may be made of alumina which has a refractive index of approximately 1.8. The clad layer 29 has a thickness in the range of 0.1 to 0.5 μm, for example. The top surface of the clad layer 29 constitutes the top surface 201c of the slider 201.

Figure 3:
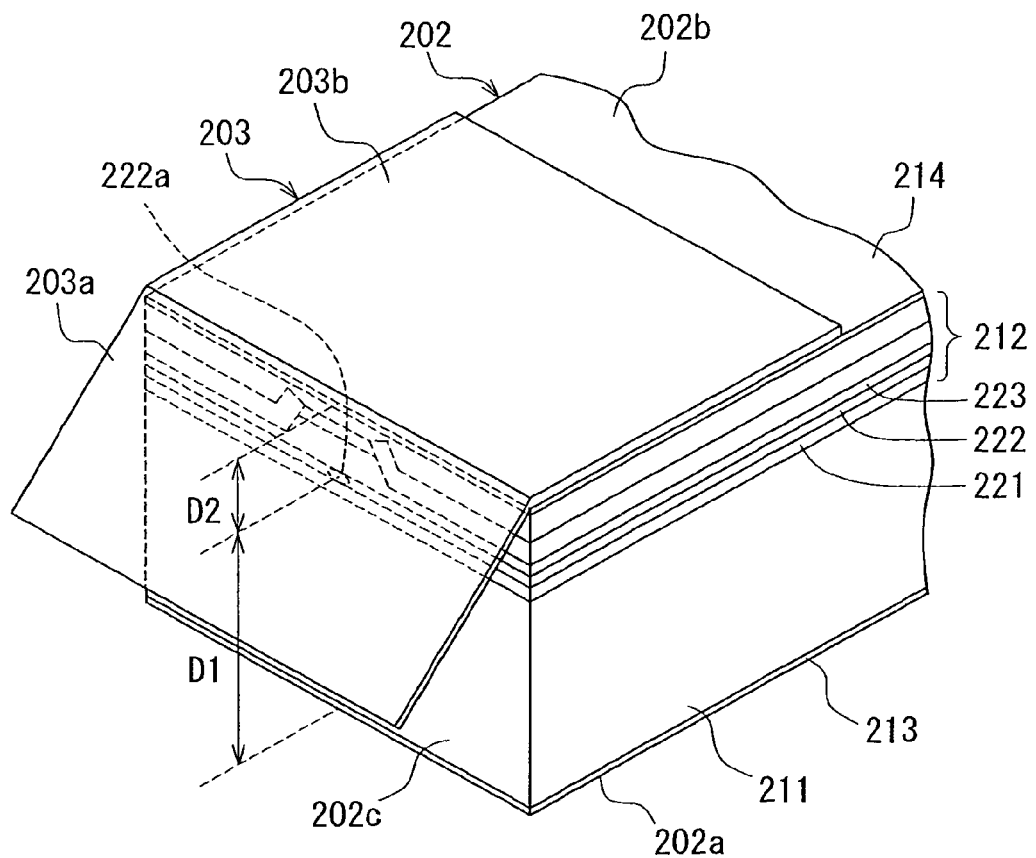
FIG. 3 is a perspective view showing the laser diode and the external mirror of FIG. 1.

Reference is now made to FIG. 3 to describe the laser diode 202 and the external mirror 203. FIG. 3 is a perspective view showing the laser diode 202 and the external mirror 203. As shown in FIG. 3, the laser diode 202 includes: an n-substrate 211 having a top surface and a bottom surface; a laser structure part 212 disposed on the top surface of the n-substrate 211; an n-electrode 213 joined to the bottom surface of the n-substrate 211; and a p-electrode 214 joined to the laser structure part 212 such that the laser structure part 212 is sandwiched between the n-substrate 211 and the p-electrode 214. The laser structure part 212 includes at least an n-clad layer 221, an active layer 222 and a p-clad layer 223. The n-clad layer 221 is disposed between the n-substrate 211 and the active layer 222. The p-clad layer 223 is disposed between the p-electrode 214 and the active layer 222. The active layer 222 has a surface that faces the n-clad layer 221, and a surface that faces the p-clad layer 223.

The laser diode 202 is rectangular-solid-shaped, having a bottom surface 202a and a top surface 202b lying at opposite ends in a direction perpendicular to the plane of the active layer 222, and four surfaces that connect the bottom surface 202a and the top surface 202b to each other. The bottom surface 202a and the top surface 202b are parallel to the plane of the active layer 222. The bottom surface 202a is formed by the surface of the n-electrode 213. The top surface 202b is formed by the surface of the p-electrode 214. The surface 202c, which is one of the four surfaces connecting the bottom surface 202a and the top surface 202b to each other, includes an emission part 222a for emitting laser light. The emission part 222a lies at an end of the active layer 222. The surface 202c thus corresponds to the emitting end face according to the present invention. The bottom surface 202a and the top surface 202b each have an area greater than that of the emitting end face 202c.

The laser diode 202 is fixed to the slider 201 such that the bottom surface 202a lying at an end in the direction perpendicular to the plane of the active layer 222 faces the top surface 201c of the slider 201. In the present embodiment, in particular, the bottom surface 202a of the laser diode 202 is joined to the top surface 201c of the slider 201. For example, an adhesive is used to join the bottom surface 202a of the laser diode 202 to the top surface 201c of the slider 201.

The slider 201 may include a conductor layer that is arranged to be exposed in the top surface 201c and connects the n-electrode 213 of the laser diode 202 to one of the terminals 210. Here, the n-electrode 213 may be electrically connected to the conductor layer by joining the bottom surface 202a of the laser diode 202 to the top surface 201c of the slider 201. In such a case, the bottom surface 202a of the laser diode 202 and the conductor layer are connected to each other by soldering, for example. The p-electrode 214 of the laser diode 202 is connected to another one of the terminals 210 with a bonding wire, for example.

Figure 6:
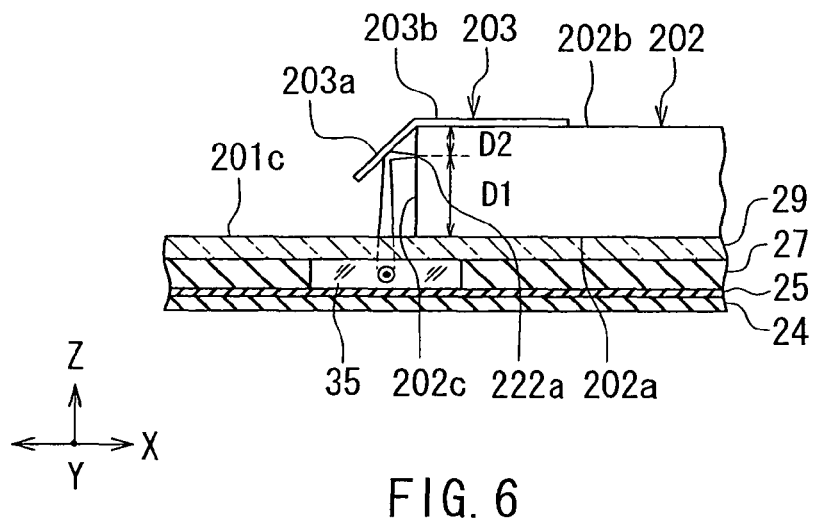
FIG. 6 is a cross-sectional view showing a part of the cross section of the heat-assisted magnetic recording head taken along line 6-6 of FIG. 5.

In the present embodiment, as shown in FIG. 3 and FIG. 6, the distance D1 between the bottom surface 202a and the emission part 222a of the laser diode 202 is greater than the distance D2 between the top surface 202b and the emission part 222a of the laser diode 202.

The external mirror 203 includes a reflecting part 203a and a to-be-fixed part 203b that have a plate-like shape each and are coupled to each other to form an angle of 135° therebetween. The to-be-fixed part 203b is fixed to the top surface 202b, whereby the external mirror 203 is fixed to the laser diode 202. The reflecting part 203a is located in front of the emission part 222a. One of the surfaces of the reflecting part 203a that is closer to the emission part 222a constitutes a reflecting surface for reflecting the laser light emitted from the emission part 222a toward the waveguide 26 in the slider 201. The normal to the reflecting surface forms an angle of 45° with respect to the direction of travel of the laser light emitted from the emission part 222a.

The external mirror 203 can be formed by, for example, molding a body out of an insulating material such as resin or glass, and forming a metal film on at least a part of the body that is to make the reflecting surface by vapor deposition, sputtering, or the like.

The portion of the slider 201 from the return magnetic pole layer 10 to the clad layer 29, and the laser diode 202 and the external mirror 203 constitute a recording head.

Figure 2:
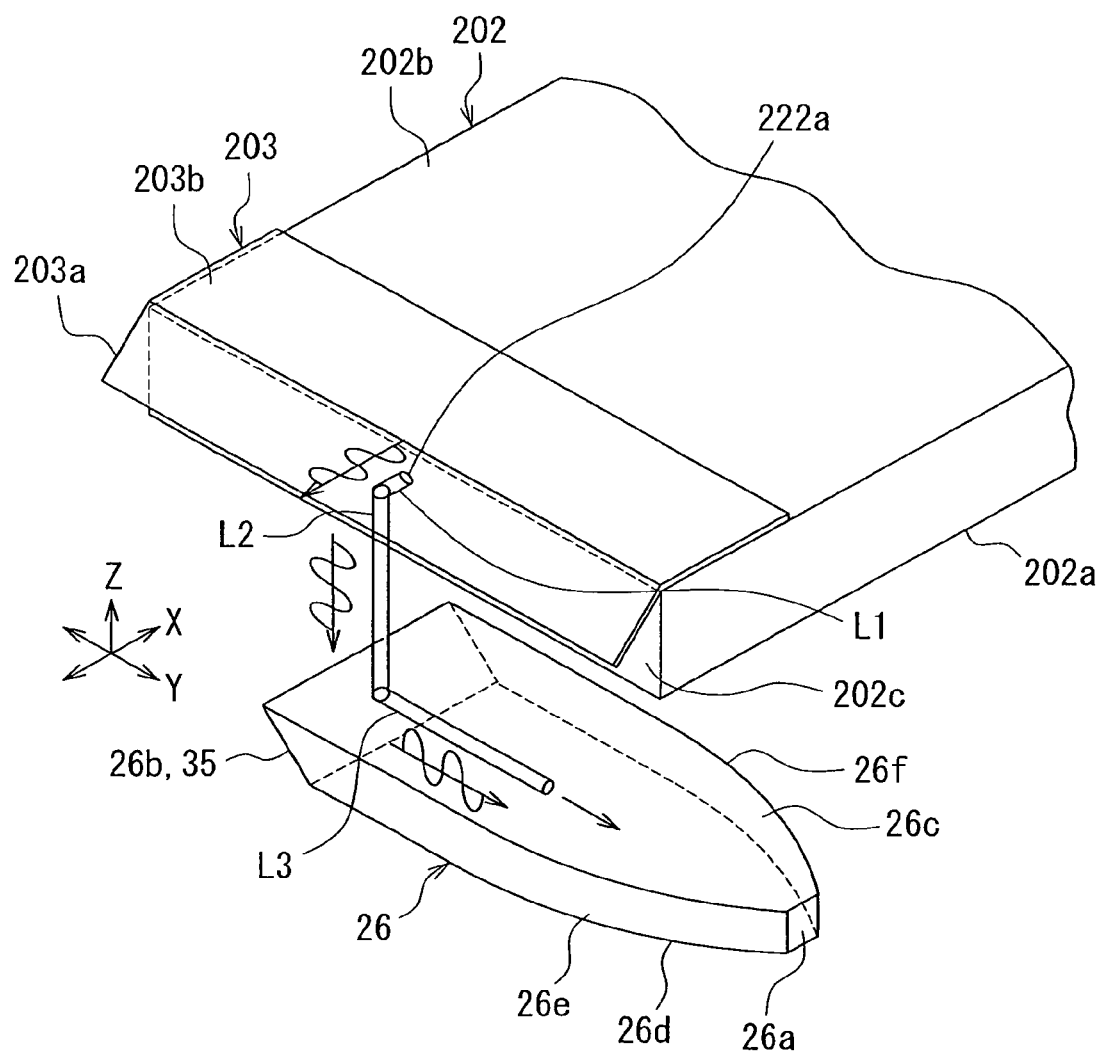
FIG. 2 is a perspective view showing the positional relationship between the laser diode, external mirror, internal mirror, and waveguide of FIG. 1, and the direction of polarization of laser light.

Reference is now made to FIG. 1, FIG. 2, FIG. 6 and FIG. 7 to describe the path of the laser light emitted from the emission part 222a of the laser diode 202. FIG. 2 is a perspective view showing the positional relationship between the laser diode 202, the external mirror 203, the internal mirror 35, and the waveguide 26 of FIG. 1, and the direction of polarization of the laser light. FIG. 6 is a cross-sectional view showing a part of the cross section of the heat-assisted magnetic recording head 200 taken along line 6-6 of FIG. 5. The X, Y and Z directions shown in FIG. 4 are also shown in FIG. 2 and FIG. 6. In FIG. 6 the Y direction is orthogonal to the X and Z directions.

The laser light emitted from the emission part 222a of the laser diode 202 is reflected at the reflecting surface of the reflecting part 203a of the external mirror 203, passes through the clad layer 29, and enters the waveguide 26 from the top surface 26c to reach the rear end face 26b. The laser light is then reflected by the internal mirror 35 so as to travel through the waveguide 26 toward the medium facing surface 201a (front end face 26a).

As shown in FIG. 1 and FIG. 2, the laser light emitted from the emission part 222a will be designated by the reference symbol L1; the laser light reflected by the external mirror 203 will be designated by the reference symbol L2; and the laser light reflected by the internal mirror 35 will be designated by the reference symbol L3. In the present embodiment, the laser diode 202, the external mirror 203, the internal mirror 35 and the wave guide 26 are arranged so that the direction of travel of the laser light L1 emitted from the emission part 222a and the direction of travel of the laser light L3 reflected by the internal mirror 35 are orthogonal to each other as viewed from above the top surface 201c of the slider 201.

FIG. 1 and FIG. 2 show an example of the configuration of the waveguide 26. In this example, the two side surfaces 26e and 26f of the waveguide 26 are formed as a reflecting surface of parabolic shape in the vicinity of the front end face 26a as viewed from above. This reflecting surface has the function of collecting the light propagating through the waveguide 26 to the vicinity of the front end face 26a.

With reference to FIG. 2, the direction of polarization of the laser light in the present embodiment will be described. In the present embodiment, the laser diode 202 emits linearly polarized laser light whose electric field oscillates in a direction parallel to the plane of the active layer 222, i.e., laser light of TE mode, from the emission part 222a. The direction of oscillation of the electric field of the laser light emitted from the emission part 222a is parallel to the XY plane. The laser light emitted from the emission part 222a is reflected at the reflecting surface of the reflecting part 203a of the external mirror 203 and travels toward the waveguide 26. Here, the direction of oscillation of the electric field of this laser light is parallel to the YZ plane. This laser light passes through the clad layer 29, enters the waveguide 26 from the top surface 26c, and is reflected by the internal mirror 35. The direction of oscillation of the electric field of the laser light reflected by the internal mirror 35 is parallel to the YZ plane. The laser light reflected by the internal mirror 35 propagates through the waveguide 26 to reach the opposed portion 26g. The direction of oscillation of the electric field of this laser light is perpendicular to the opposed portion 26g. This makes it possible to produce surface plasmons of high intensity on the near-field light generating element 23.

As has been described, the heat-assisted magnetic recording head 200 according to the present embodiment includes the slider 201, the edge-emitting laser diode 202 fixed to the slider 201, and the external mirror 203 provided outside the slider 201. The slider 201 includes: the medium facing surface 201a that faces the recording medium; the reproducing head; and a portion of the recording head excluding the laser diode 202 and the external mirror 203 (hereinafter, referred to as an in-slider portion of the recording head). The reproducing head and the in-slider portion of the recording head are stacked on the substrate 1. The in-slider portion of the recording head is located on the front side (trailing side) relative to the reproducing head in the direction of travel of the recording medium (Z direction).

The reproducing head includes: the MR element 5 as the read element; the bottom shield layer 3 and the top shield layer 7 for shielding the MR element 5, the respective portions of the bottom shield layer 3 and the top shield layer 7 located near the medium facing surface 201a being opposed to each other with the MR element 5 therebetween; the bottom shield gap film 4 disposed between the MR element 5 and the bottom shield layer 3; and the top shield gap film 6 disposed between the MR element 5 and the top shield layer 7.

The in-slider portion of the recording head includes the return magnetic pole layer 10, the coil 12, the coupling layer 13, the bottom yoke layer 17, and the magnetic pole 20. The coil 12 produces a magnetic field corresponding to data to be recorded on the recording medium. The return magnetic pole layer 10, the coupling layer 13, the bottom yoke layer 17 and the magnetic pole 20 form a magnetic path for passing a magnetic flux corresponding to the magnetic field produced by the coil 12. The magnetic pole 20 allows the magnetic flux corresponding to the magnetic field produced by the coil 12 to pass and produces a recording magnetic field for recording data on the recording medium by means of the perpendicular magnetic recording system. The position of the end of a bit pattern to be recorded on the recording medium depends on the position of the top edge, i.e., the edge farther from the top surface 1a of the substrate 1, of the end face of the magnetic pole 20 located in the medium facing surface 201a. The width of the end face of the magnetic pole 20 located in the medium facing surface 201a taken at the top edge defines the track width. The return magnetic pole layer 10, the coupling layer 13 and the bottom yoke layer 17 have the function of returning a magnetic flux to the magnetic pole 20, the magnetic flux having been generated from the magnetic pole 20 and having magnetized the recording medium.

The in-slider portion of the recording head further includes the near-field light generating element 23, the interposition layer 25, the waveguide 26, the clad layers 27, 28 and 29, and the internal mirror 35. The top surface 1a of the substrate 1 faces toward the magnetic pole 20, the near-field light generating element 23 and the waveguide 26. The near-field light generating element 23 and the waveguide 26 are disposed farther from the top surface 1a of the substrate 1 than is the magnetic pole 20.

The outer surface of the near-field light generating element 23 includes: the first end face 23a that is located in the medium facing surface 201a; the second end face 23b that is spaced from the medium facing surface 201a; and the coupling portion that couples the first end face 23a and the second end face 23b to each other. The coupling portion includes: the top surface 23c that is spaced from the top surface 1a of the substrate 1; and the two side surfaces 23d and 23e that decrease in distance from each other with decreasing distance to the top surface 1a of the substrate 1. The first end face 23a includes the near-field light generating part 23f. The length HPA of the near-field light generating element 23 in the direction perpendicular to the medium facing surface 201a (the Y direction) is greater than the length TPA of the first end face 23a in the direction perpendicular to the top surface 1a of the substrate 1. As will be detailed later, surface plasmons are excited on the near-field light generating element 23 based on the light propagating through the waveguide 26. The surface plasmons propagate to the near-field light generating part 23f, and the near-field light generating part 23f generates near-field light based on the surface plasmons.

The waveguide 26 is disposed farther from the top surface 1a of the substrate 1 than is the near-field light generating element 23. The outer surface of the waveguide 26 includes the opposed portion 26g that is opposed to a part of the top surface 23c of the near-field light generating element 23 with the interposition layer 25 interposed therebetween.

Each of the interposition layer 25 and the clad layers 27, 28 and 29 is made of a dielectric material having a refractive index lower than that of the waveguide 26. Consequently, the outer surface of the waveguide 26 excluding the rear end face 26b is covered with the dielectric material that is lower in refractive index than the waveguide 26.

The recording head further includes the edge-emitting laser diode 202 fixed to the slider 201, and the external mirror 203 provided outside the slider 201. The slider 201 has the top surface 201c that lies above the top surface 1a of the substrate 1, at the end of the slider 201 farther from the top surface 1a of the substrate 1. The laser diode 202 includes: the active layer 222; the emitting end face 202c that lies at the end in the direction parallel to the plane of the active layer 222 and includes the emission part 222a for emitting laser light; and the bottom surface 202a that lies at an end in the direction perpendicular to the plane of the active layer 222. The laser diode 202 is arranged so that the bottom surface 202a faces the top surface 201c of the slider 201. The external mirror 203 reflects the laser light emitted from the emission part 222a toward the waveguide 26 in the slider 201. The laser light reflected by the external mirror 203 passes through the clad layer 29, and enters the waveguide 26 from the top surface 26c to reach the rear end face 26b, where the laser light is reflected by the internal mirror 35 so as to travel through the waveguide 26 toward the medium facing surface 201a (front end face 26a).

Now, the principle of generation of near-field light in the present embodiment and the principle of heat-assisted magnetic recording using the near-field light will be described in detail. As described above, the laser light emitted from the emission part 222a of the laser diode 202 is reflected by the external mirror 203, passes through the clad layer 29, enters the waveguide 26 from the top surface 26c and reaches the rear end face 26b, where the laser light is reflected by the internal mirror 35 so as to travel through the waveguide 26 toward the medium facing surface 201a (front end face 26a). This laser light propagates through the waveguide 26 to reach the vicinity of the opposed portion 26g. The laser light is then totally reflected at the interface between the opposed portion 26g and the interposition layer 25, and this generates evanescent light permeating into the interposition layer 25. As a result, the evanescent light and the collective oscillations of charges on the top surface 23c of the near-field light generating element 23, i.e., surface plasmons, are coupled with each other to excite a system of surface plasmon polaritons. In this way, surface plasmons are excited on the near-field light generating element 23.

The surface plasmons excited on the near-field light generating element 23 propagate along the top surface 23c and the first end face 23a of the near-field light generating element 23 toward the near-field light generating part 23f. Consequently, the surface plasmons concentrate at the near-field light generating part 23f, and the near-field light generating part 23f generates near-field light based on the surface plasmons. The near-field light is projected toward the recording medium, reaches the surface of the recording medium and heats a part of the magnetic recording layer of the recording medium. This lowers the coercivity of the part of the magnetic recording layer. In heat-assisted magnetic recording, the part of the magnetic recording layer with the lowered coercivity is subjected to a recording magnetic field produced by the magnetic pole 20 for data recording.

Reference is now made to FIG. 10A to FIG. 19A and FIG. 10B to FIG. 19B to describe a method of manufacturing the heat-assisted magnetic recording head 200 according to the present embodiment. FIG. 10A to FIG. 19A each show a cross section of a stack of layers formed in the process of manufacturing the heat-assisted magnetic recording head 200, the cross section being perpendicular to the medium facing surface and the substrate. In FIG. 10A to FIG. 19A the symbol "ABS" indicates the position where the medium facing surface 201a is to be formed. FIG. 10B to FIG. 19B show cross sections at the position ABS of FIG. 10A to FIG. 19A, respectively.

Figure 10A:
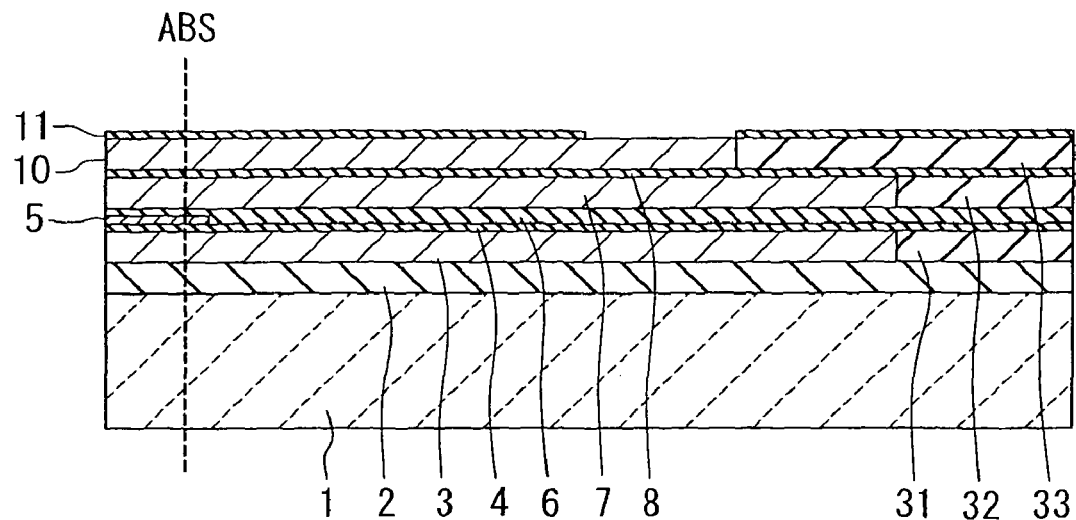
FIG. 10A and FIG. 10B are explanatory diagrams showing a step of a method of manufacturing the heat-assisted magnetic recording head according to the first embodiment of the invention.
Figure 10B:
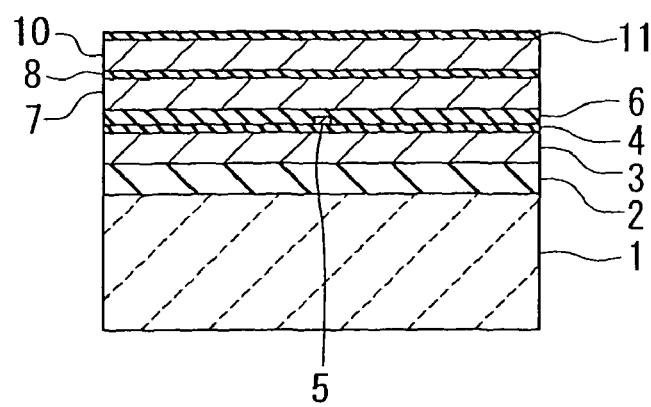

In the method of manufacturing the heat-assisted magnetic recording head 200 according to the present embodiment, first, the insulating layer 2 is formed on the substrate 1 as shown in FIG. 10A and FIG. 10B. Next, the bottom shield layer 3 is formed on the insulating layer 2. Next, the insulating layer 31 is formed to cover the bottom shield layer 3. Next, the insulating layer 31 is polished by, for example, chemical mechanical polishing (hereinafter referred to as CMP) until the bottom shield layer 3 is exposed, whereby the bottom shield layer 3 and the insulating layer 31 are flattened at the top. Next, the bottom shield gap film 4 is formed over the bottom shield layer 3 and the insulating layer 31. Next, the MR element 5 and leads (not shown) connected to the MR element 5 are formed on the bottom shield gap film 4. Next, the top shield gap film 6 is formed to cover the MR element 5 and the leads. Next, the top shield layer 7 is formed on the top shield gap film 6. Next, the insulating layer 32 is formed to cover the top shield layer 7. Next, the insulating layer 32 is polished by, for example, CMP until the top shield layer 7 is exposed, whereby the top shield layer 7 and the insulating layer 32 are flattened at the top. Next, the nonmagnetic layer 8 is formed over the top shield layer 7 and the insulating layer 32. Next, the return magnetic pole layer 10 is formed on the nonmagnetic layer 8. Next, the insulating layer 33 is formed to cover the return magnetic pole layer 10. Next, the insulating layer 33 is polished by, for example, CMP until the return magnetic pole layer 10 is exposed, whereby the return magnetic pole layer 10 and the insulating layer 33 are flattened at the top. Next, the insulating layer 11 is formed on part of the top surfaces of the return magnetic pole layer 10 and the insulating layer 33.

Figure 11A:
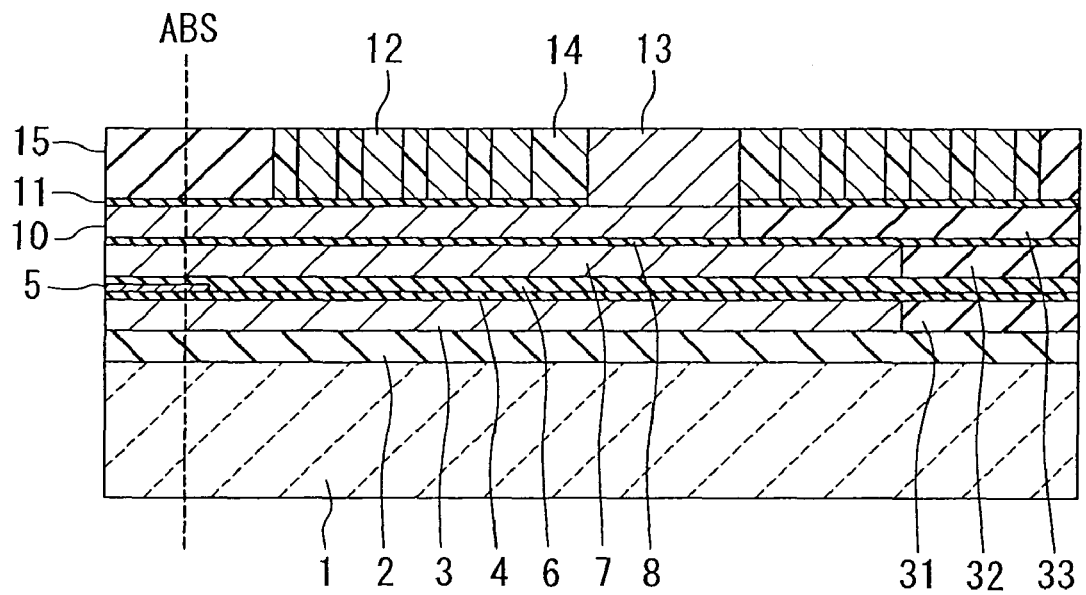
FIG. 11A and FIG. 11B are explanatory diagrams showing a step that follows the step of FIG. 10A and FIG. 10B.
Figure 11B:
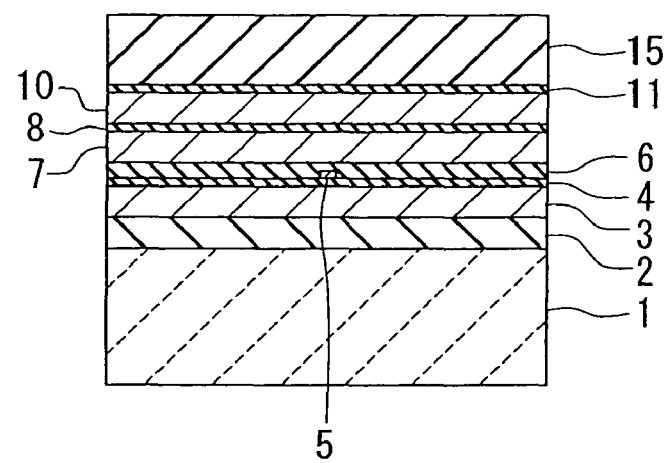

FIG. 11A and FIG. 11B show the next step. In this step, first, the coil 12 is formed on the insulating layer 11 by, for example, frame plating. Next, the coupling layer 13 is formed on the return magnetic pole layer 10 by, for example, frame plating. Alternatively, the coil 12 may be formed after forming the coupling layer 13. Next, the insulating layer 14 made of photoresist, for example, is selectively formed around the coil 12 and in the space between every adjacent turns of the coil 12. Next, the insulating layer 15 is formed over the entire top surface of the stack by, for example, sputtering. Next, the insulating layer 15 is polished by, for example, CMP until the coil 12 and the coupling layer 13 are exposed, whereby the coil 12, the coupling layer 13 and the insulating layers 14 and 15 are flattened at the top.

Figure 12A:
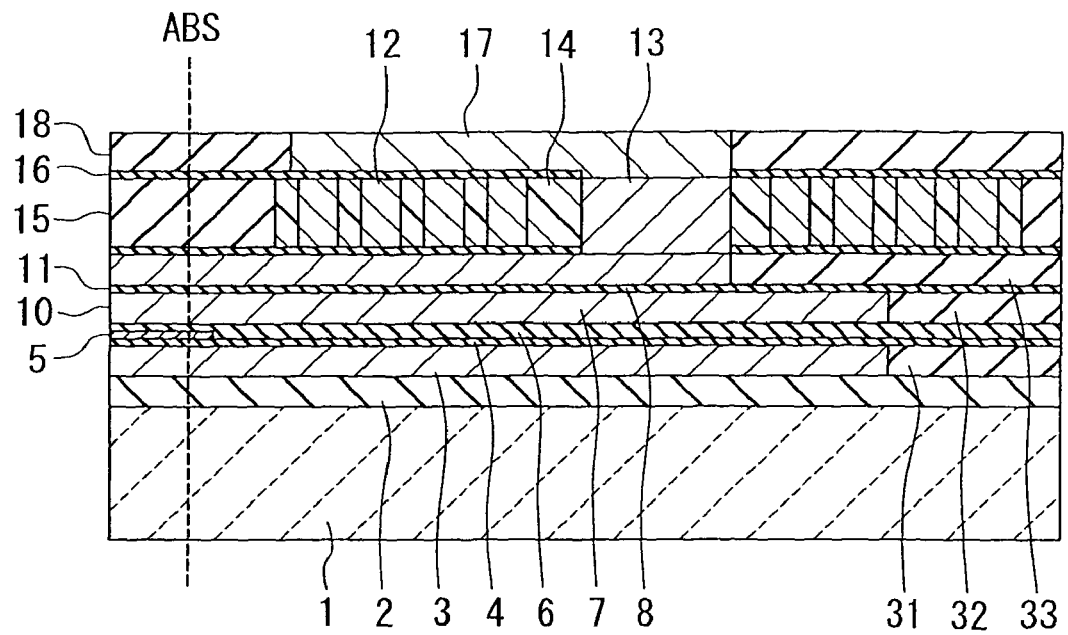
FIG. 12A and FIG. 12B are explanatory diagrams showing a step that follows the step of FIG. 11A and FIG. 11B.
Figure 12B:
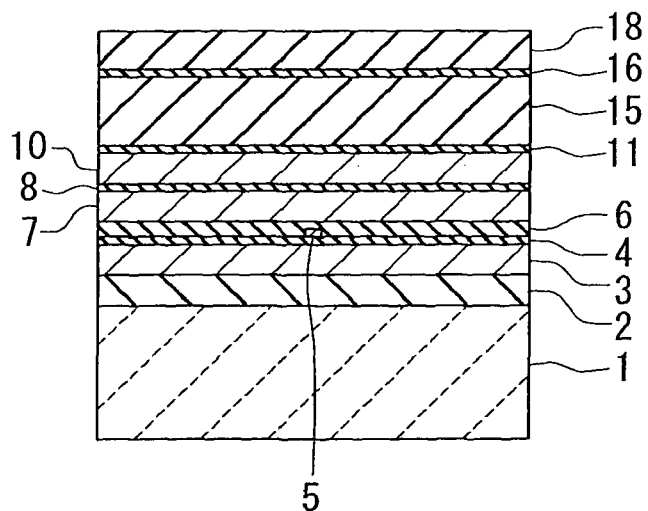

FIG. 12A and FIG. 12B show the next step. In this step, first, the bottom yoke layer 17 is formed over the coupling layer 13 and the insulating layer 16 by, for example, frame plating. Next, the nonmagnetic layer 18 is formed over the entire top surface of the stack. Next, the nonmagnetic layer 18 is polished by, for example, CMP until the bottom yoke layer 17 is exposed, whereby the bottom yoke layer 17 and the nonmagnetic layer 18 are flattened at the top.

Figure 13A:
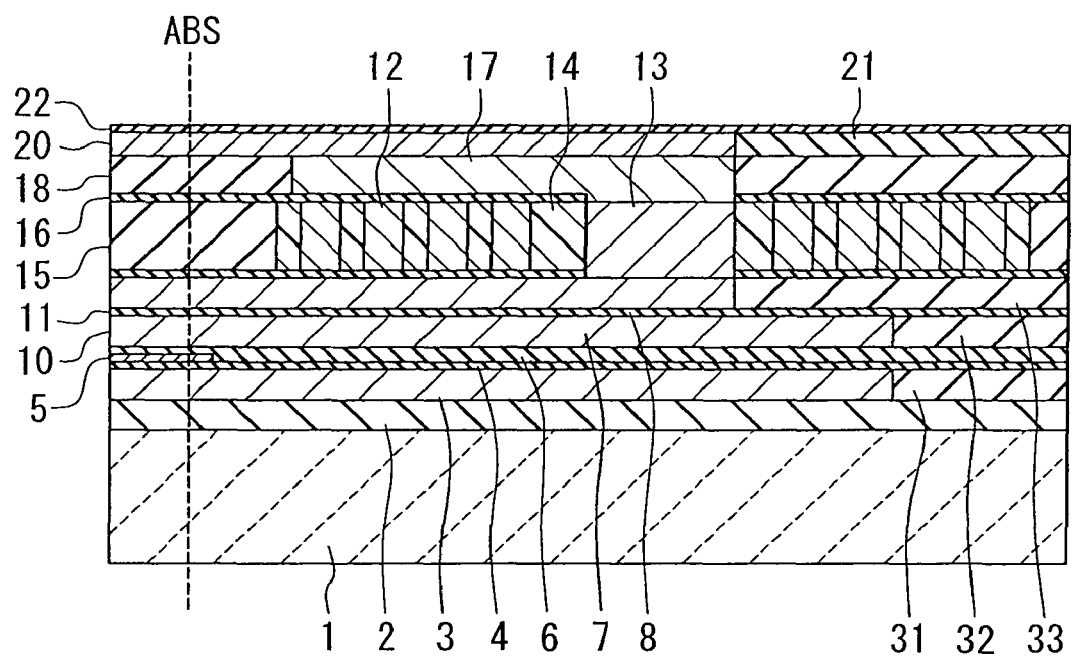
FIG. 13A and FIG. 13B are explanatory diagrams showing a step that follows the step of FIG. 12A and FIG. 12B.
Figure 13B:
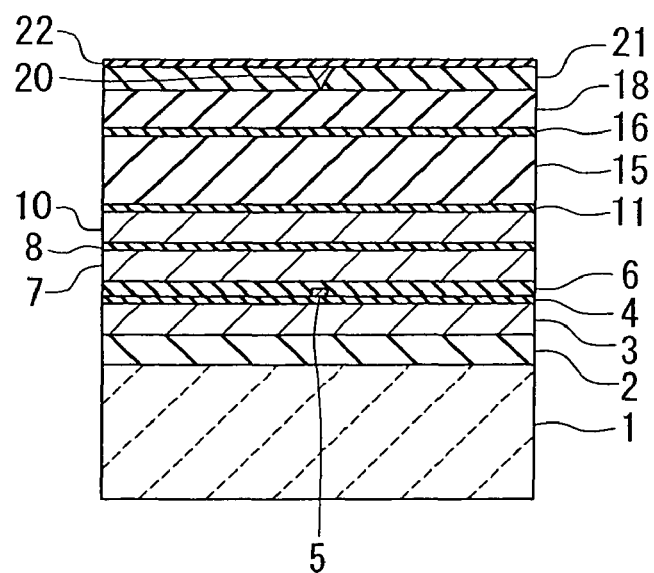

FIG. 13A and FIG. 13B show the next step. In this step, first, the nonmagnetic layer 21 is formed over the bottom yoke layer 17 and the nonmagnetic layer 18. Next, the nonmagnetic layer 21 is selectively etched to form therein a groove for accommodating the magnetic pole 20. Next, the magnetic pole 20 is formed by, for example, frame plating, such that the magnetic pole 20 is accommodated in the groove of the nonmagnetic layer 21. Next, the magnetic pole 20 and the nonmagnetic layer 21 are polished by, for example, CMP, whereby the magnetic pole 20 and the nonmagnetic layer 21 are flattened at the top. Next, the insulating layer 22 is formed over the magnetic pole 20 and the nonmagnetic layer 21.

Figure 14A:
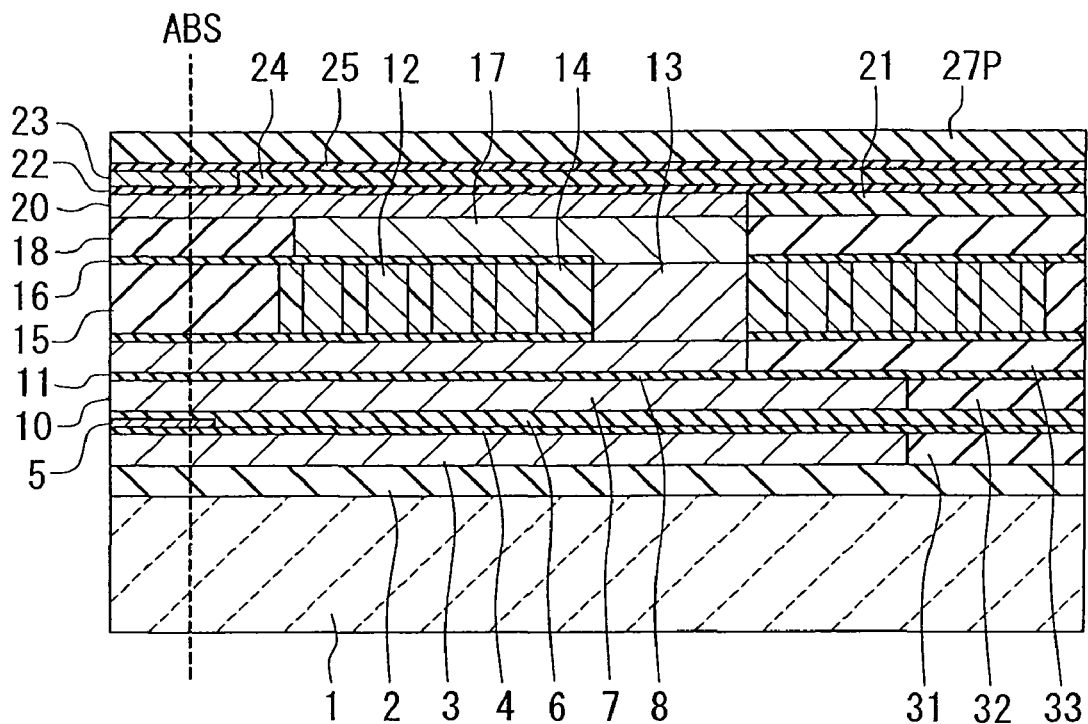
FIG. 14A and FIG. 14B are explanatory diagrams showing a step that follows the step of FIG. 13A and FIG. 13B.
Figure 14B:
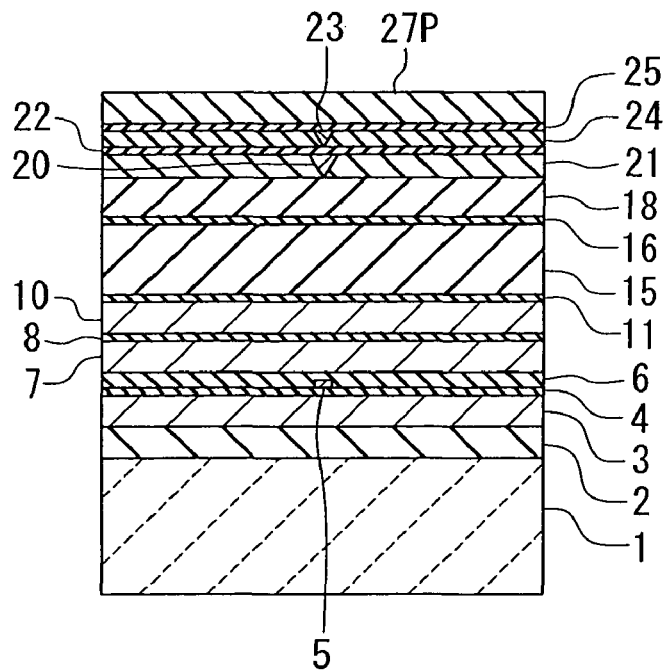

FIG. 14A and FIG. 14B show the next step. In this step, first, the insulating layer 24 is formed on the insulating layer 22. Next, the insulating layer 24 is selectively etched to form therein a groove for accommodating the near-field light generating element 23. Next, the near-field light generating element 23 is formed to be accommodated in the groove of the insulating layer 24. Next, the interposition layer 25 is formed over the near-field light generating element 23 and the insulating layer 24. Next, a dielectric layer 27P, which is to make the clad layer 27 afterward, is formed on the interposition layer 25.

Figure 15A:
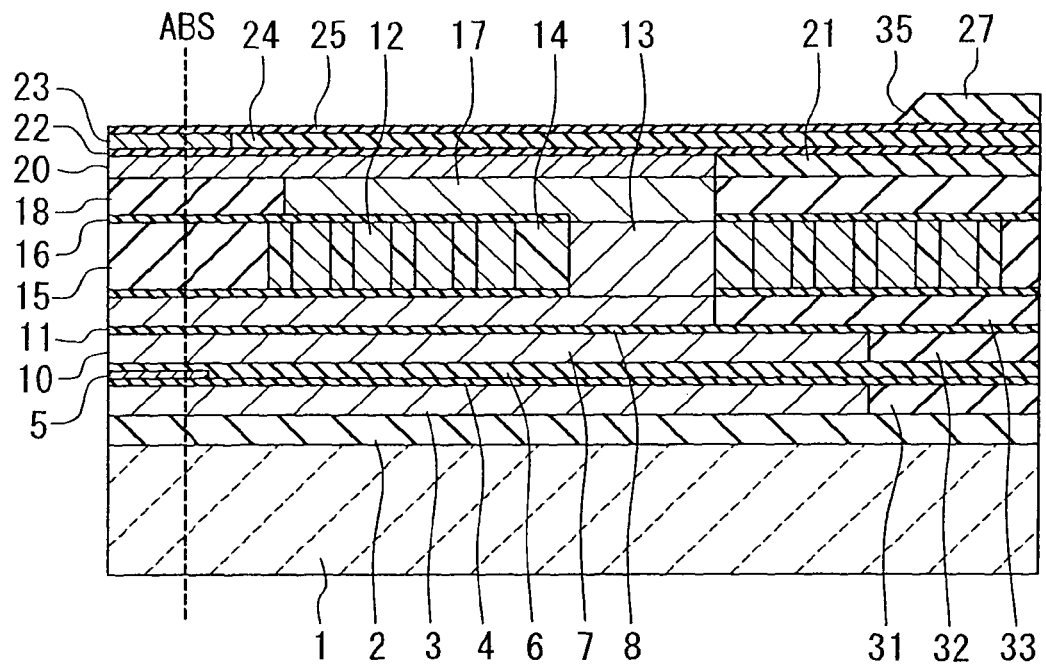
FIG. 15A and FIG. 15B are explanatory diagrams showing a step that follows the step of FIG. 14A and FIG. 14B.
Figure 15B:
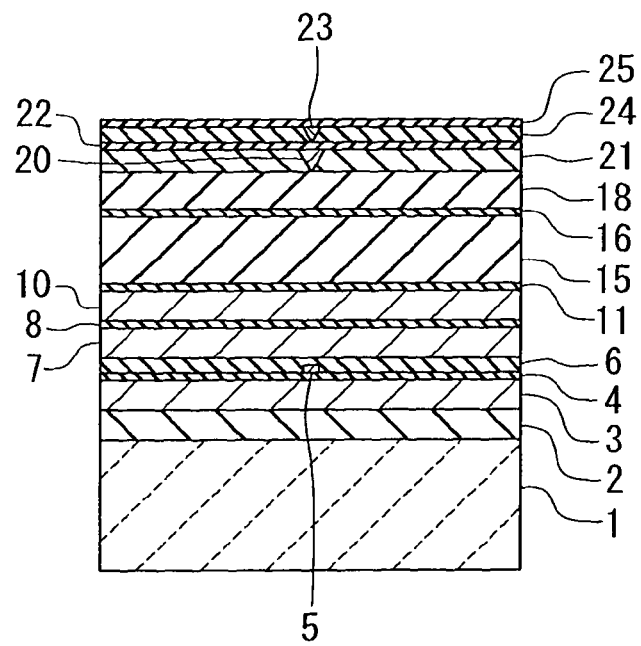

FIG. 15A and FIG. 15B show the next step. In this step, first, a not-shown metal mask having a plane shape corresponding to that of the clad layer 27 is formed on the dielectric layer 27P. Next, the clad layer 27 is formed by selectively etching the dielectric layer 27P by, for example, reactive ion etching (hereinafter referred to as RIE). Here, the dielectric layer 27P is taper-etched so that the clad layer 27 will have an oblique surface for the internal mirror 35 to be formed thereon. Then, the internal mirror 35 is formed on the oblique surface of the clad layer 27.

Figure 16A:
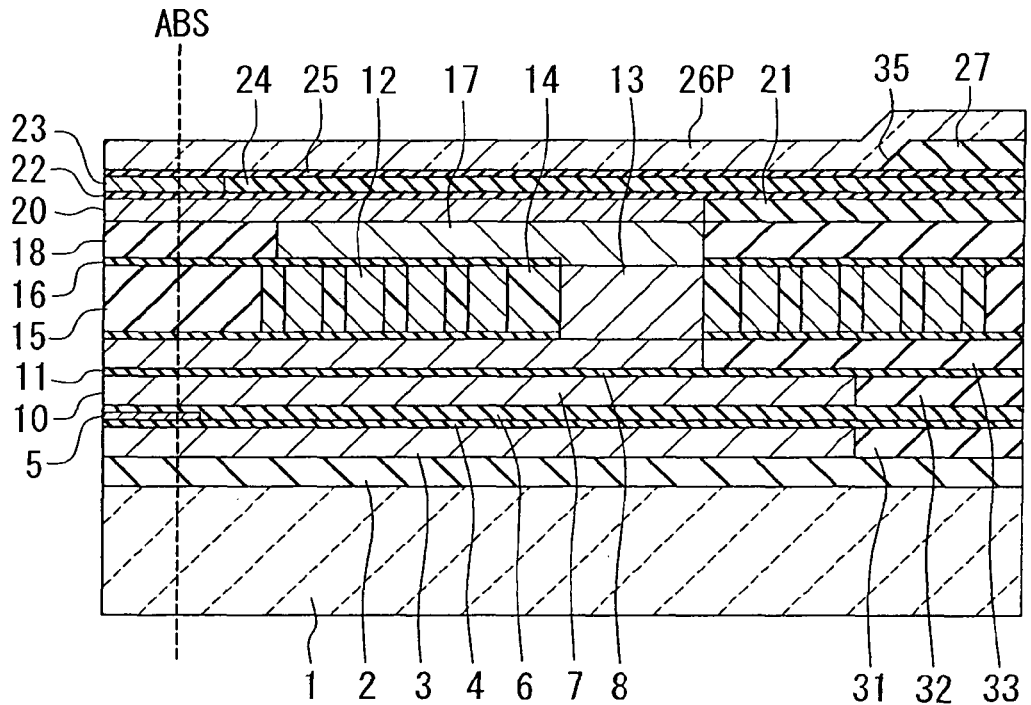
FIG. 16A and FIG. 16B are explanatory diagrams showing a step that follows the step of FIG. 15A and FIG. 15B.
Figure 16B:
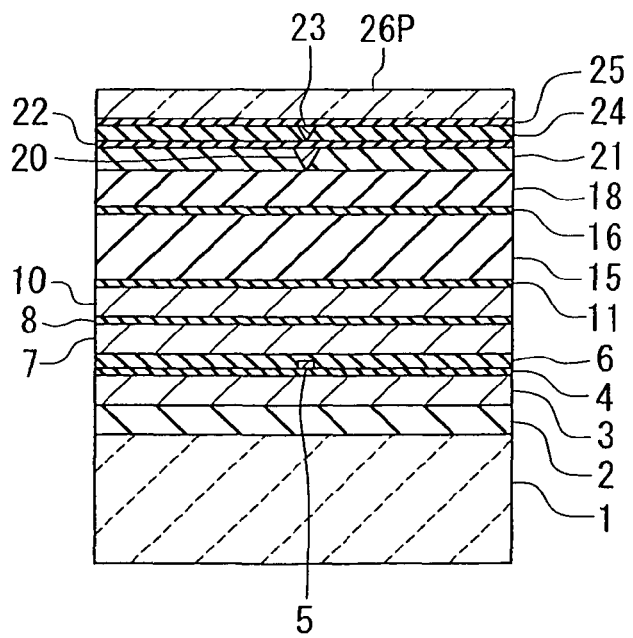

Next, as shown in FIG. 16A and FIG. 16B, a dielectric layer 26P, which is to make the waveguide 26 afterward, is formed over the entire top surface of the stack.

Figure 17A:
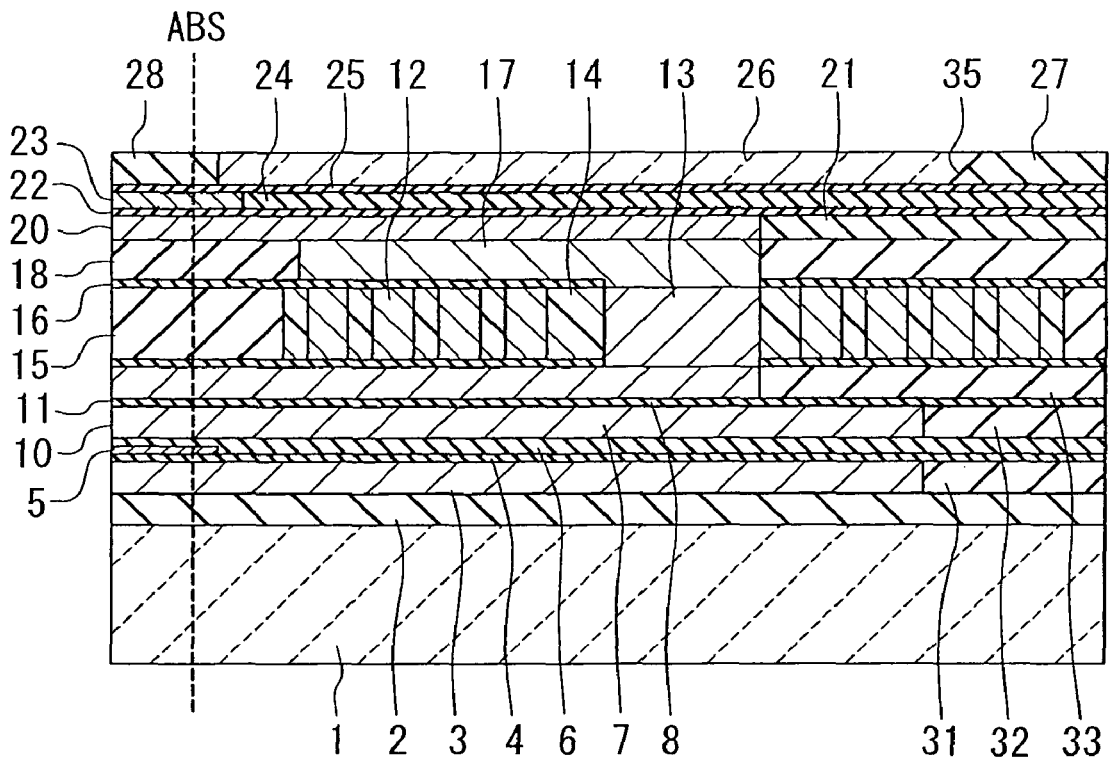
FIG. 17A and FIG. 17B are explanatory diagrams showing a step that follows the step of FIG. 16A and FIG. 16B.
Figure 17B:
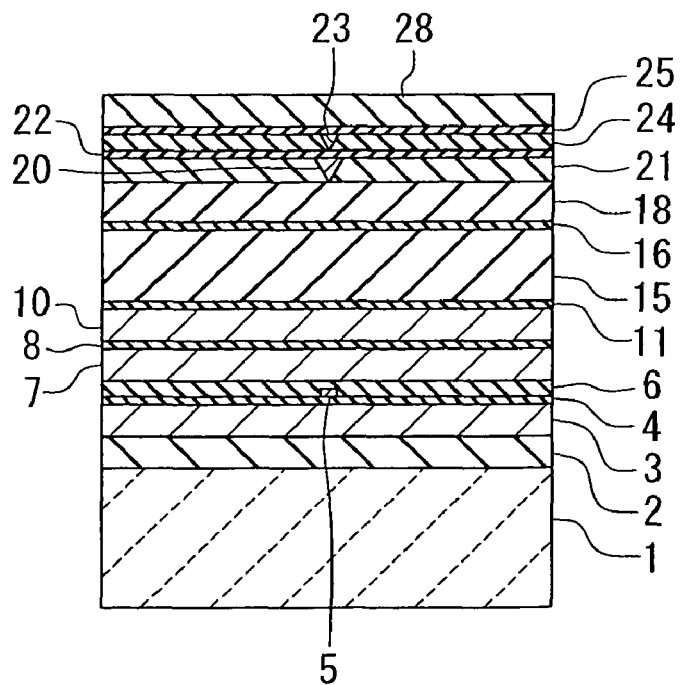

FIG. 17A and FIG. 17B show the next step. In this step, first, the waveguide 26 is formed by selectively etching the dielectric layer 26P by, for example, RIE. Next, a dielectric layer that is to make the clad layer 28 afterward is formed over the entire top surface of the stack. The dielectric layer is then polished by, for example, CMP until the waveguide 26 is exposed. The dielectric layer remaining after the polishing makes the clad layer 28. This polishing also flattens the waveguide 26 and the clad layers 27 and 28 at the top.

Figure 18A:
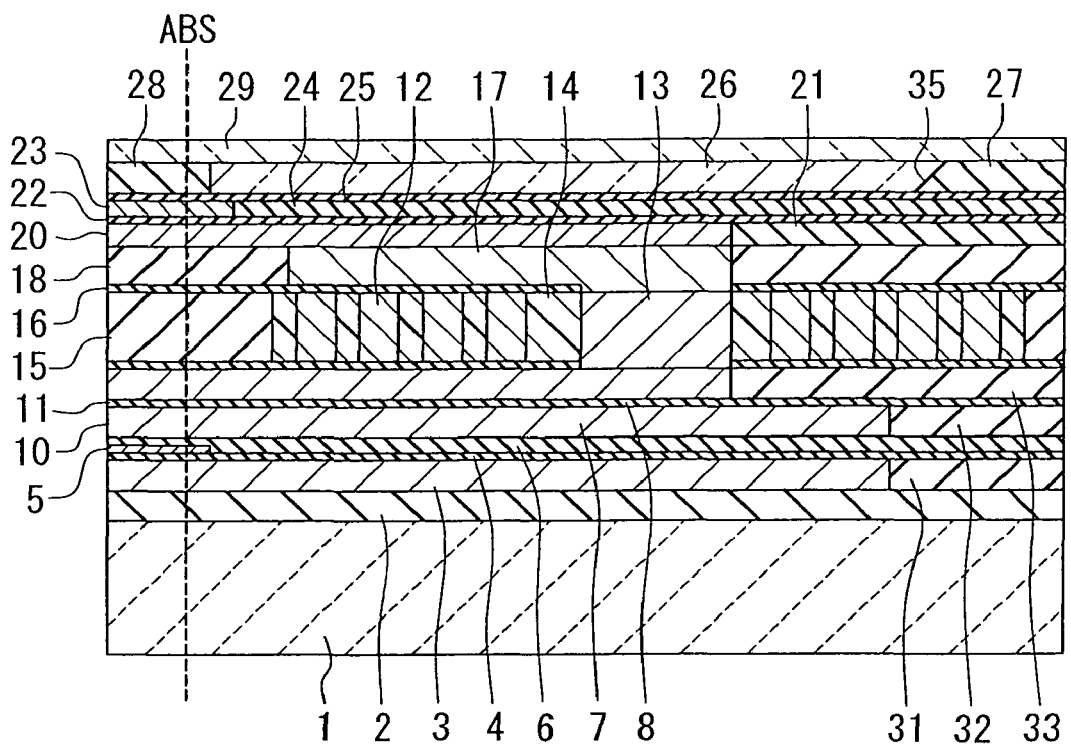
FIG. 18A and FIG. 18B are explanatory diagrams showing a step that follows the step of FIG. 17A and FIG. 17B.
Figure 18B:
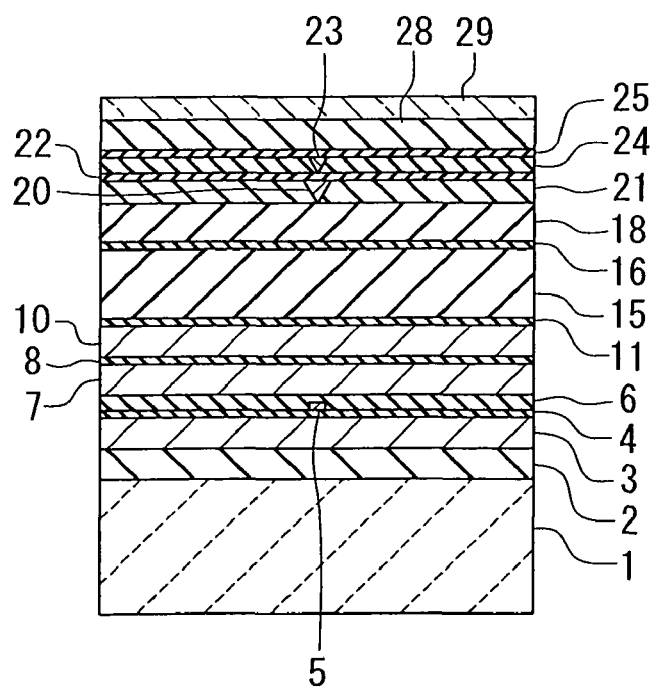

Next, as shown in FIG. 18A and FIG. 18B, the clad layer 29 is formed over the entire top surface of the stack. Wiring, the terminals 210 and so on are then formed on the top surface of the clad layer 29.

Figure 19A:
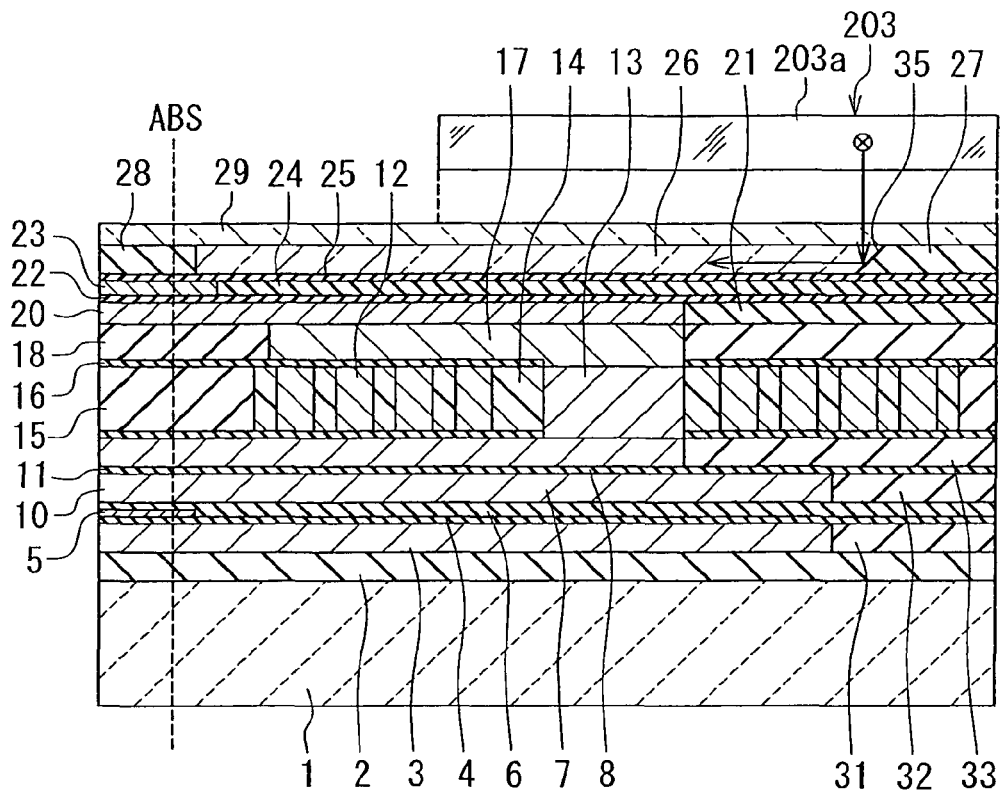
FIG. 19A and FIG. 19B are explanatory diagrams showing a step that follows the step of FIG. 18A and FIG. 18B.
Figure 19B:
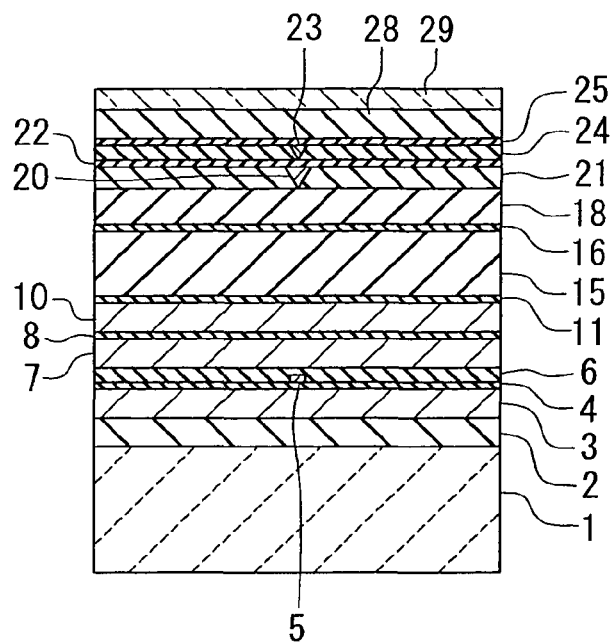

Next, as shown in FIG. 19A and FIG. 19B, the laser diode 202 with the external mirror 203 fixed thereto is fixed to the top surface of the clad layer 29.

Next, the substrate is cut into sliders, and polishing of the medium facing surface 201a, fabrication of flying rails, etc. are performed to thereby complete the heat-assisted magnetic recording head 200.

As has been described, in the heat-assisted magnetic recording head 200 according to the present embodiment, the opposed portion 26g of the outer surface of the waveguide 26 is opposed to a part of the top surface 23c of the near-field light generating element 23 with the interposition layer 25 interposed therebetween. In the present embodiment, evanescent light occurs from the interposition layer 25 based on the light propagating through the waveguide 26. Based on this evanescent light, surface plasmons are excited on the near-field light generating element 23. The surface plasmons then propagate to the near-field light generating part 23f, and the near-field light generating part 23f generates near-field light based on the surface plasmons. According to the present embodiment, it is possible to increase the efficiency of conversion of the light propagating through the waveguide 26 into the near-field light, as compared with the case where a plasmon antenna is directly irradiated with laser light to produce near-field light.

According to the present embodiment, it is possible suppress a temperature rise of the near-field light generating element 23 because the near-field light generating element 23 is not directly irradiated with the laser light propagating through the waveguide 26. In the present embodiment, the length $H_{PA}$ of the near-field light generating element 23 in the direction perpendicular to the medium facing surface 201a is greater than the length $T_{PA}$ of the first end face 23a in the direction perpendicular to the top surface 1a of the substrate 1. Thus, the near-field light generating element 23 according to the present embodiment is greater in volume than a conventional plasmon antenna in which the length in the direction perpendicular to the medium facing surface 201a is smaller than the length in the direction perpendicular to the top surface 1a of the substrate 1. This also contributes to suppression of a temperature rise of the near-field light generating element 23. Consequently, according to the present embodiment, it is possible to prevent the near-field light generating element 23 from protruding from the medium facing surface 201a.

In the heat-assisted magnetic recording head 200 according to the present embodiment, the edge-emitting laser diode 202 is used as the light source for emitting the light to be used for generating near-field light. Typically, edge-emitting laser diodes have higher optical output as compared with surface-emitting laser diodes.

The laser diode 202 is fixed to the slider 201 such that the bottom surface 202a lying at an end in the direction perpendicular to the plane of the active layer 222 faces the top surface 201c of the slider 201. The laser light emitted from the emission part 222a of the laser diode 202 is reflected by the external mirror 203 toward the waveguide 26. The bottom surface 202a of the laser diode 202 is parallel to the plane of the active layer 222 and has an area greater than that of the emitting end face 202c. In the present embodiment, it is therefore easy to position the laser diode 202 with respect to the slider 201 with high precision so that the optical axis of the laser light emitted from the emission part 222a is parallel to the top surface 201c of the slider 201. Thus, according to the present embodiment, the optical axis of the laser light emitted from the emission part 222a can be prevented from tilting with respect to a desired direction. According to the present embodiment, it is therefore possible, while using the edge-emitting laser diode 202 having a high optical output as the light source for emitting light to be used for generating near-field light, to align the laser light with the waveguide easily as compared to the case where the laser light emitted from the emission part 222a is made incident directly on the waveguide.

In the present embodiment, as shown in FIG. 1 and FIG. 2, the laser diode 202, the external mirror 203, the internal mirror 35 and the waveguide 26 are arranged so that the direction of travel of the laser light L1 emitted from the emission part 222a and the direction of travel of the laser light L3 reflected by the internal mirror 35 are orthogonal to each other as viewed from above the top surface 201c of the slider 201. According to the present embodiment, such arrangement allows the direction of polarization (the direction of oscillation of the electric field) of the laser light L3 reflected by the internal mirror 35 to be orthogonal to the direction of polarization of the laser light L1 emitted from the emission part 222a, as shown in FIG. 2. Consequently, the present embodiment makes it possible that the direction of polarization of the laser light propagating through the waveguide 26 is set to such a direction that surface plasmons of high intensity can be generated on the near-field light generating element 23, i.e., the direction perpendicular to the opposed portion 26g, while using a typical laser diode that emits laser light of TE mode as the laser diode 202.

In the heat-assisted magnetic recording head according to the present embodiment, the near-field light generating element 23 and the waveguide 26 are disposed farther from the top surface 1a of the substrate 1 than is the magnetic pole 20, and the light emitted from the laser diode 202 disposed above the waveguide 26 is reflected by the internal mirror 35 so as to travel through the waveguide 26 toward the medium facing surface 201a.

A case will now be considered where a near-field light generating element and a waveguide are disposed closer to the top surface 1a of the surface 1 than is the magnetic pole 20, i.e., in a positional relationship reverse to that of the near-field light generating element 23 and the waveguide 26 with the magnetic pole 20 according to the present embodiment. In this case, since the magnetic pole 20 lies above the near-field light generating element and the waveguide, the optical path from the laser diode to the waveguide becomes longer and the energy loss of the light increases if the laser diode is disposed above the waveguide as in the present embodiment. The longer optical path from the laser diode to the waveguide also makes it harder to precisely position the laser diode and the waveguide, thus often resulting in energy loss of the light due to misalignment between the laser diode and the waveguide.

In contrast, the present embodiment allows shortening the optical path from the laser diode 202 to the waveguide 26, thus making it possible to guide the light from the laser diode 202 to the opposed portion 26g of the outer surface of the waveguide 26 through a shorter path. According to the present embodiment, it is therefore possible to reduce the energy loss of the light. Furthermore, the present embodiment allows the laser diode 202 and the waveguide 26 to be put close to each other, which facilitates precise positioning of the laser diode 202 and the waveguide 26. Consequently, according to the present embodiment, it is possible to reduce the energy loss of the light resulting from misalignment between the laser diode 202 and the waveguide 26.

In the present embodiment, the clad layer 29 having a refractive index lower than that of the waveguide 26 is disposed on the top surface of the waveguide 26 on which the laser light is to be incident. Light that is incident on the interface between the waveguide 26 and the clad layer 29 from the side of the waveguide 26 at incident angles greater than or equal to the critical angle is thus totally reflected at the interface. This can prevent the laser light that is emitted from the laser diode 202 to pass through the clad layer 29 and enter the waveguide 26 from passing through the clad layer 29 again to return to the laser diode 202. Consequently, according to the present embodiment, it is possible to increase the use efficiency of the laser light and to prevent the laser diode 202 from being damaged by laser light that returns to the laser diode 202.

From the foregoing, the present embodiment makes it possible to increase the use efficiency of the light used for generating near-field light in the heat-assisted magnetic recording head.

Modification Example

Figure 20:
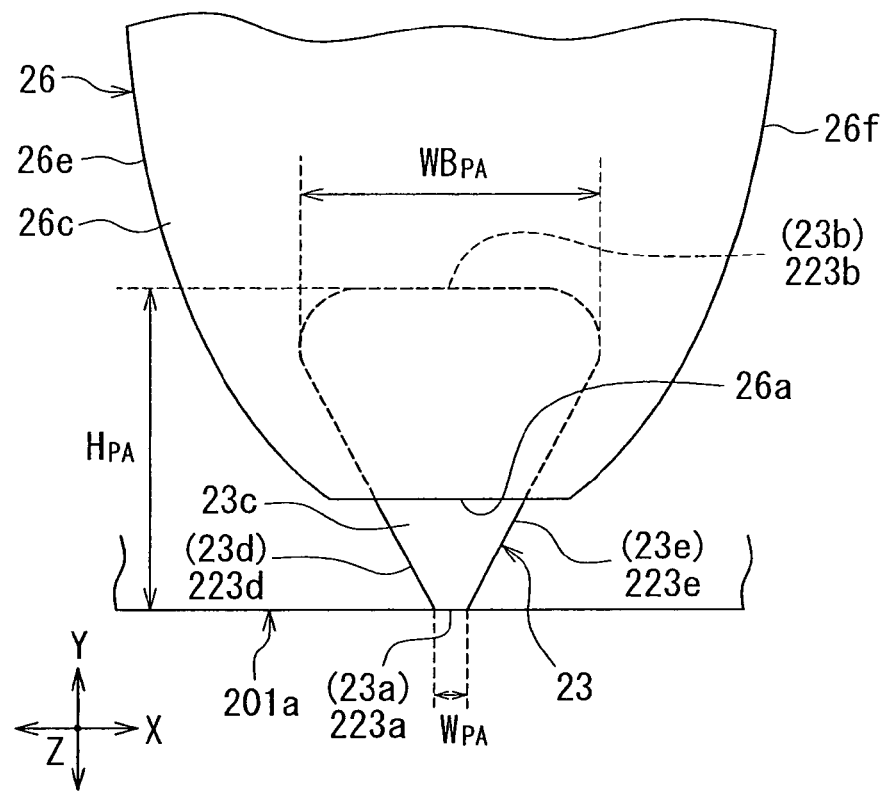
FIG. 20 is a plan view showing a part of a waveguide and a near-field light generating element of a modification example of the first embodiment of the invention.
Figure 21:
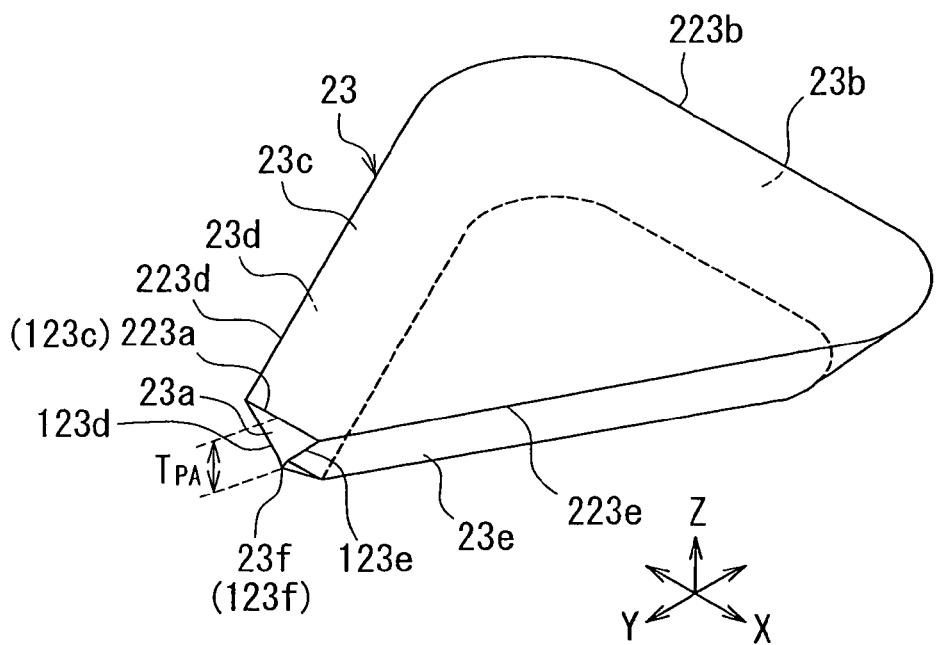
FIG. 21 is a perspective view of the near-field light generating element shown in FIG. 20.

A modification example of the present embodiment will now be described. FIG. 20 is a plan view showing a part of the waveguide 26 and the near-field light generating element 23 of the modification example. FIG. 21 is a perspective view of the near-field light generating element 23 shown in FIG. 20. In the near-field light generating element 23 of the modification example, the side surfaces 23d and 23e have their respective portions that decrease in distance from each other in the track width direction with decreasing distance to the medium facing surface 201a. The corner portion between the side surface 23d and the second end face 23b and the corner portion between the side surface 23e and the second end face 23b are both rounded. In this modification example, in particular, the side surfaces 23d and 23e excluding the above-mentioned two corner portions decrease in distance from each other in the track width direction with decreasing distance to the medium facing surface 201a.

The top surface 23c has a first edge 223a that is located at the top end of the first end face 23a, a second edge 223b that is located at the top end of the second end face 23b, a third edge 223d that is located at the top end of the side surface 23d, and a fourth edge 223e that is located at the top end of the side surface 23e. The third edge 223d and the fourth edge 223e have their respective portions that decrease in distance from each other in a direction parallel to the first edge 223a with decreasing distance to the first edge 223a. The corner portion between the second edge 223b and the third edge 223d and the corner portion between the second edge 223b and the fourth edge 223e are both rounded. In this modification example, in particular, the third edge 223d and the fourth edge 223e excluding the above-mentioned two corner portions decrease in distance from each other in the direction parallel to the first edge 223a with decreasing distance to the first edge 223a.

A part of the bottom surface 26d of the waveguide 26 is opposed to a part of the top surface 23c of the near-field light generating element 23 with the interposition layer 25 interposed therebetween. FIG. 20 shows an example in which the front end face 26a of the waveguide 26 is located away from the medium facing surface 201a. However, the front end face 26a may be located in the medium facing surface 201a.

As shown in FIG. 21, the near-field light generating element 23 of the modification example is configured so that an area near the first end face 23a (hereinafter, referred to as front end vicinity area) has a bottom end that gets farther from the top surface 1a of the substrate 1 with decreasing distance to the first end face 23a. Only in the front end vicinity area of the near-field light generating element 23, each of the side surfaces 23d and 23e includes an upper part and a lower part that are continuous with each other, and the angle formed between the lower part of the side surface 23d and the lower part of the side surface 23e is smaller than that formed between the upper part of the side surface 23d and the upper part of the side surface 23e. In the area other then front end vicinity area of the near-field light generating element 23, the side surfaces 23d and 23e are each planar or almost planar in shape.

The first end face 23a includes: a first side 123d that is located at an end of the first side surface 23d; a second side 123e that is located at an end of the second side surface 23e; a third side 123c that is located at an end of the top surface 23c; and a pointed tip 123f that is formed by contact of the first side 123d and the second side 123e with each other and constitutes the near-field light generating part 23f. Specifically, the near-field light generating part 23f refers to the pointed tip 123f and its vicinity in the end face 23a.

The first side 123d includes an upper part and a lower part that are continuous with each other. The second side 123e includes an upper part and a lower part that are continuous with each other. The angle formed between the lower part of the first side 123d and the lower part of the second side 123e is smaller than the angle formed between the upper part of the first side 123d and the upper part of the second side 123e.

As shown in FIG. 20, the length of the near-field light generating element 23 in the direction perpendicular to the medium facing surface 201a will be denoted by the symbol $H_{P4}$; the width of the first end face 23a at its top edge will be denoted by the symbol $W_{P4}$; and the maximum width of the near-field light generating element 23 in the track width direction (the X direction) will be denoted by the symbol $WB_{P4}$. As shown in FIG. 21, the length of the first end face 23a in the direction perpendicular to the top surface 1a of the substrate 1 will be denoted by the symbol $T_{P4}$. The length $H_{P4}$ of the near-field light generating element 23 in the direction perpendicular to the medium facing surface 201a is greater than the length $T_{P4}$ of the first end face 23a in the direction perpendicular to the top surface 1a of the substrate 1. $W_{P4}$ falls within the range of 50 to 350 nm, for example. $T_{P4}$ falls within the range of 60 to 350 nm, for example. $H_{P4}$ falls within the range of 0.25 to 2.5 µm, for example. $WB_{P4}$ falls within the range of 0.25 to 2.5 µm, for example.

The modification example allows an increase in area of the opposed portion of the waveguide 26 opposed to a part of the top surface 23c of the near-field light generating element 23. Consequently, it is possible to excite more surface plasmons on the top surface 23c of the near-field light generating element 23. According to the modification example, in the top surface 23c of the near-field light generating element 23, the corner portion between the second edge 223b and the third edge 223d and the corner portion between the second edge 223b and the fourth edge 223e are both rounded. This can prevent near-field light from occurring from these corner portions. In the modification example, the top surface 23c of the near-field light generating element 23 is configured so that the third edge 223d and the fourth edge 223e of the top surface 23c of the near-field light generating element 23, excluding the foregoing two corner portions, decrease in distance from each other in the direction parallel to the first edge 223a with decreasing distance to the first edge 223a. This configuration can concentrate surface plasmons excited on the top surface 23c while the surface plasmons propagate to the first end face 23a. According to the modification example, it is therefore possible to concentrate more surface plasmons at the near-field light generating part 23f of pointed shape.

Second Embodiment

Figure 22:
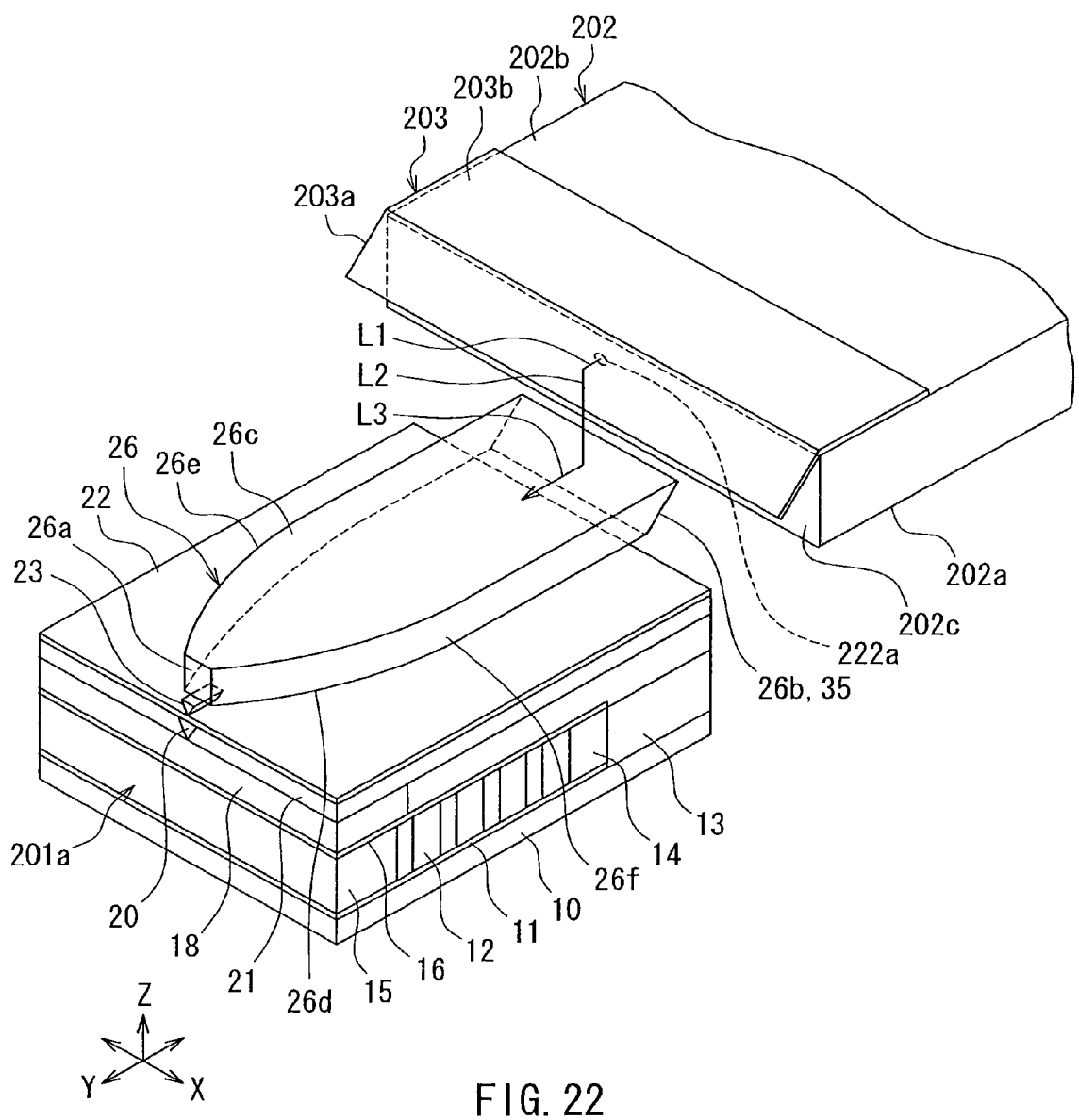
FIG. 22 is a perspective view showing the main part of a heat-assisted magnetic recording head according to a second embodiment of the invention.
Figure 23:
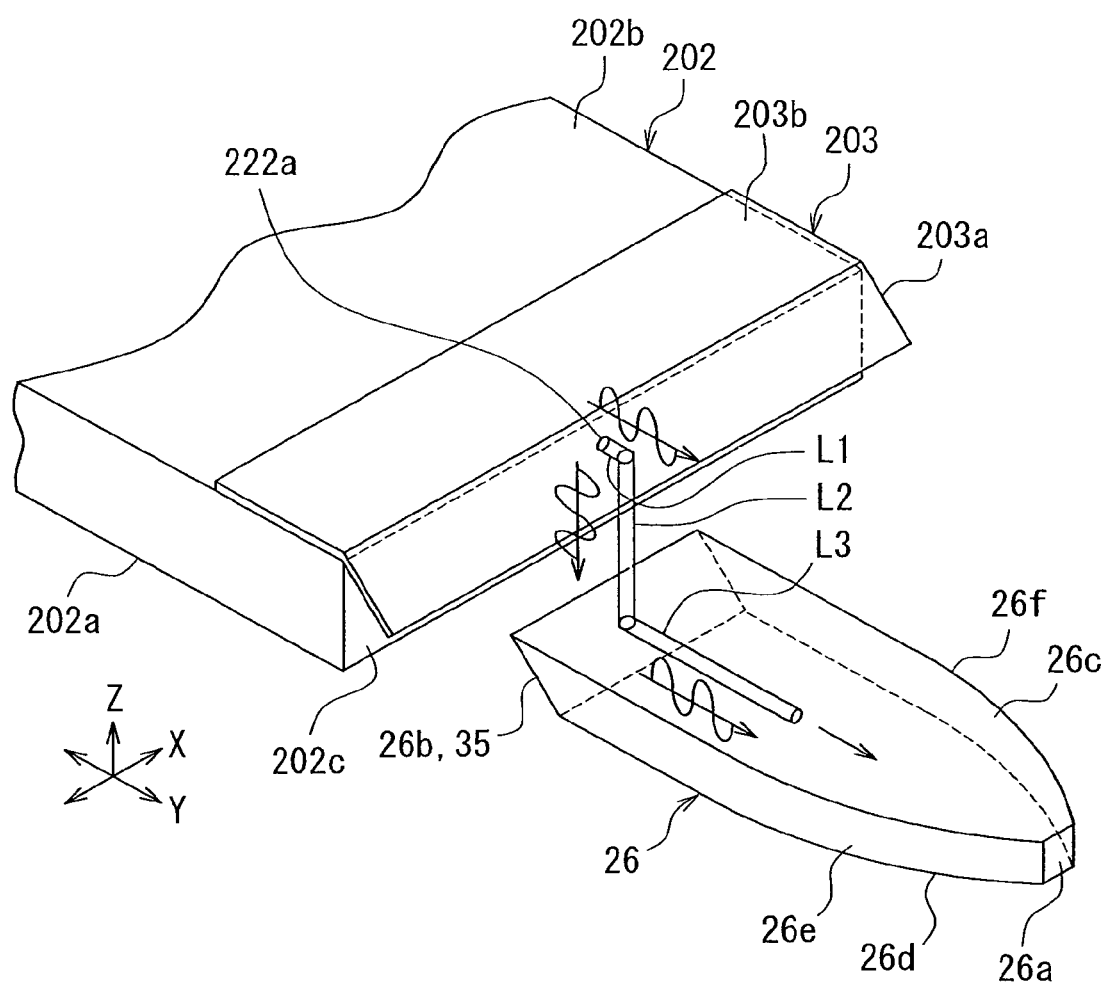
FIG. 23 is a perspective view showing the positional relationship between the laser diode, external mirror, internal mirror, and waveguide of FIG. 22, and the direction of polarization of laser light.
Figure 24:
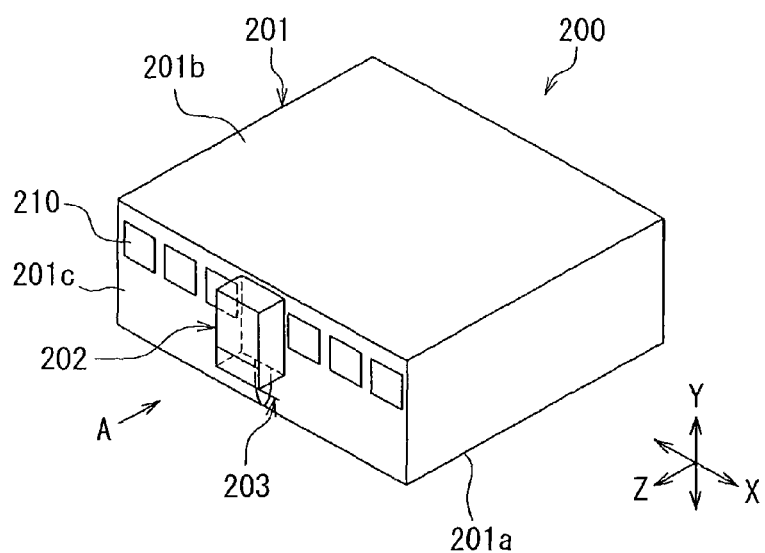
FIG. 24 is a perspective view of the heat-assisted magnetic recording head according to the second embodiment of the invention.
Figure 25:
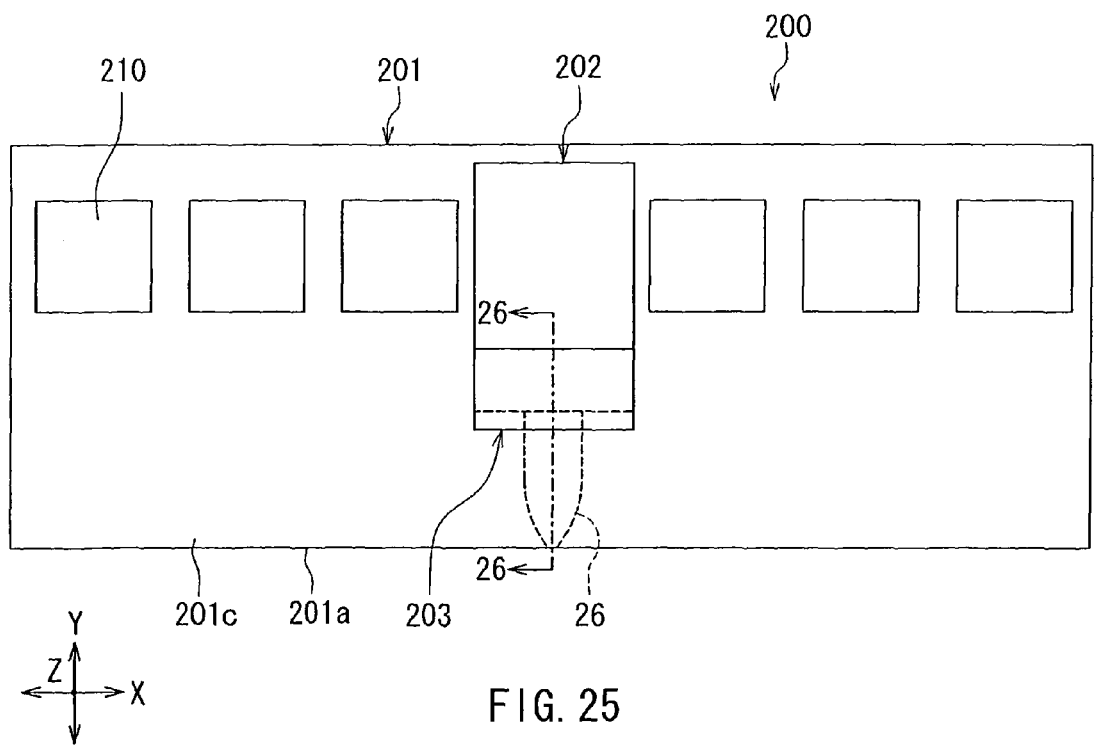
FIG. 25 is a plan view showing the heat-assisted magnetic recording head as viewed from the direction A of FIG. 24.
Figure 26:
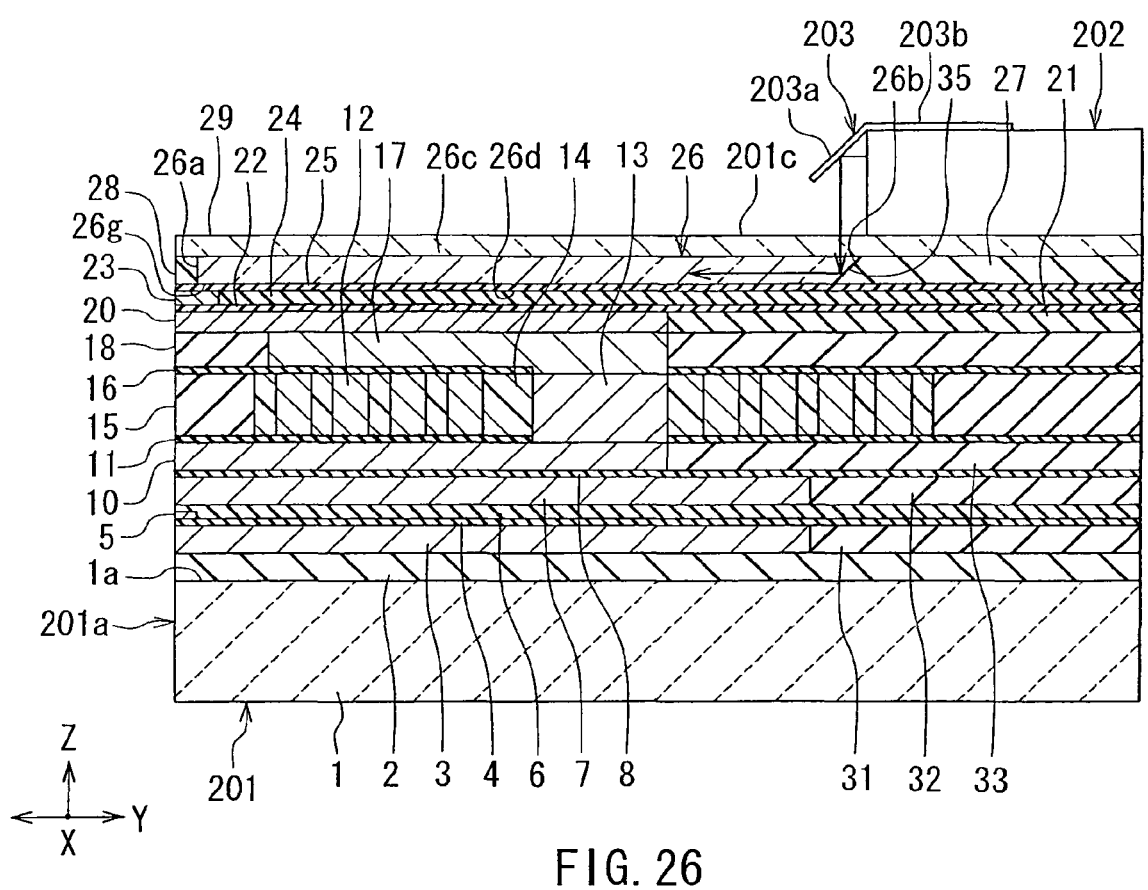
FIG. 26 shows a cross section taken along line 26-26 of FIG. 25.

A heat-assisted magnetic recording head according to a second embodiment of the present invention will now be described with reference to FIG. 22 to FIG. 26. FIG. 22 is a perspective view showing the main part of the heat-assisted magnetic recording head 200 according to the present embodiment. FIG. 23 is a perspective view showing the positional relationship between the laser diode 202, the external mirror 203, the internal mirror 35, and the waveguide 26 of FIG. 22, and the direction of polarization of laser light. FIG. 24 is a perspective view of the heat-assisted magnetic recording head 200 according to the present embodiment. FIG. 25 is a plan view showing the heat-assisted magnetic recording head 200 as viewed from the direction A of FIG. 24. FIG. 26 is a cross-sectional view showing the configuration of the slider 201. FIG. 26 shows a cross section taken along line 26-26 of FIG. 25.

In the present embodiment, as shown in FIG. 22 to FIG. 26, the laser diode 202, the external mirror 203, the internal mirror 35 and the waveguide 26 are arranged so that the direction of travel of the laser light L1 emitted from the emission part 222a and the direction of travel of the laser light L3 reflected by the internal mirror 35 are parallel to each other.

In the present embodiment, as shown in FIG. 23, the laser diode 202 emits linearly polarized laser light whose electric field oscillates in the direction perpendicular to the plane of the active layer 222, i.e., laser light of TM mode, from the emission part 222a. The direction of oscillation of the electric field of the laser light emitted from the emission part 222a is parallel to the YZ plane. The laser light emitted from the emission part 222a is reflected at the reflecting surface of the reflecting part 203a of the external mirror 203 and travels toward the waveguide 26. Here, the direction of oscillation of the electric field of this laser light is parallel to the YZ plane. This laser light passes through the clad layer 29, enters the waveguide 26 from the top surface 26c, and is reflected by the internal mirror 35. The direction of oscillation of the electric field of the laser light reflected by the internal mirror 35 is parallel to the YZ plane. The laser light reflected by the internal mirror 35 propagates through the waveguide 26 to reach the opposed portion 26g. The direction of oscillation of the electric field of this laser light is perpendicular to the opposed portion 26g. This makes it possible to produce surface plasmons of high intensity on the near-field light generating element 23.

The remainder of configuration, function and effects of the present embodiment are similar to those of the first embodiment.

Third Embodiment

Figure 27:
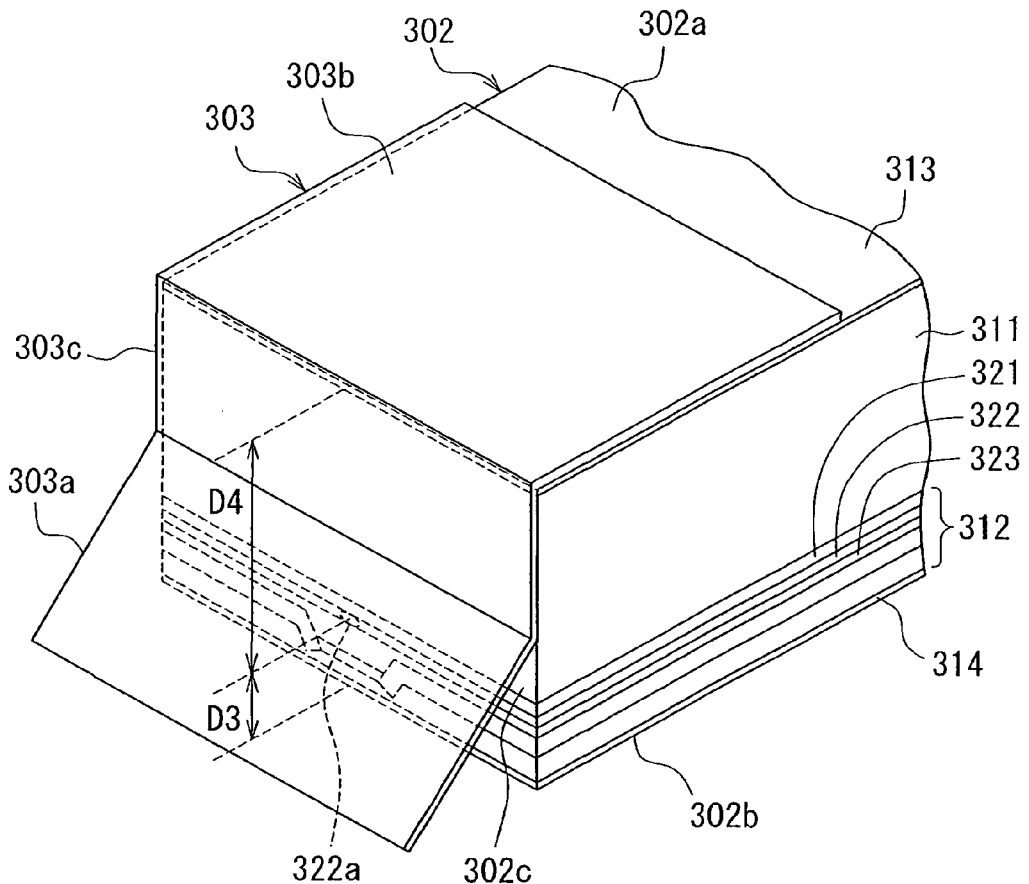
FIG. 27 is a perspective view showing a laser diode and an external mirror of a third embodiment of the invention.
Figure 28:
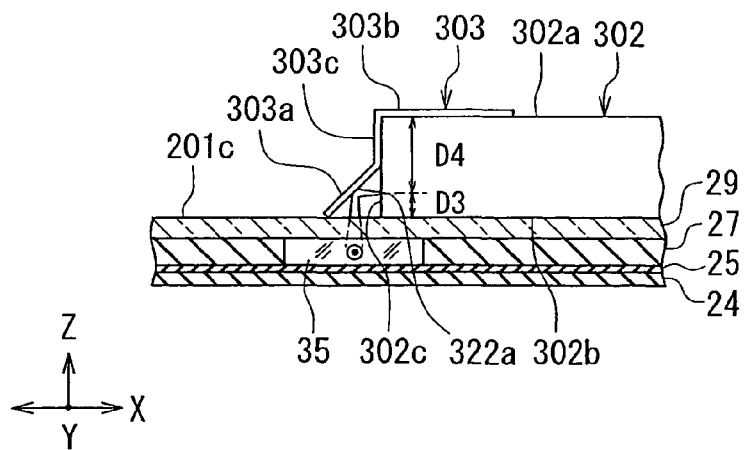
FIG. 28 is a cross-sectional view showing the laser diode, the external mirror and an internal mirror of the third embodiment of the invention.

A heat-assisted magnetic recording head according to a third embodiment of the present invention will now be described with reference to FIG. 27 and FIG. 28. FIG. 27 is a perspective view showing a laser diode and an external mirror of the present embodiment. FIG. 28 is a cross-sectional view showing the laser diode, the external mirror and an internal mirror of the present embodiment.

The heat-assisted magnetic recording head according to the present embodiment has a laser diode 302 and an external mirror 303 shown in FIG. 27 and FIG. 28 instead of the laser diode 202 and the external mirror 203 of the first embodiment. As shown in FIG. 27, the laser diode 302 of the present embodiment has the same configuration as that of the laser diode 202 of the first embodiment. Nevertheless, the laser diode 302 is fixed to the top surface 201c of the slider 201 in a vertically inverted orientation relative to the laser diode 202. More specifically, the laser diode 302 includes: an n-substrate 311 having a top surface and a bottom surface; a laser structure part 312 disposed under the bottom surface of the n-substrate 311; an n-electrode 313 joined to the top surface of the n-substrate 311; and a p-electrode 314 joined to the laser structure part 312 such that the laser structure part 312 is sandwiched between the n-substrate 311 and the p-electrode 314. The laser structure part 312 includes at least an n-clad layer 321, an active layer 322 and a p-clad layer 323. The n-clad layer 321 is disposed between the n-substrate 311 and the active layer 322. The p-clad layer 323 is disposed between the p-electrode 314 and the active layer 322. The active layer 322 has a surface that faces the n-clad layer 321, and a surface that faces the p-clad layer 323.

The laser diode 302 is rectangular-solid-shaped, having a top surface 302a and a bottom surface 302b lying at opposite ends in a direction perpendicular to the plane of the active layer 322, and four surfaces that connect the top surface 302a and the bottom surface 302b to each other. The top surface 302a and the bottom surface 302b are parallel to the plane of the active layer 322. The top surface 302a is formed by the surface of the n-electrode 313. The bottom surface 302b is formed by the surface of the p-electrode 314. The surface 302c, which is one of the four surfaces connecting the top surface 302a and the bottom surface 302b to each other, includes an emission part 322a for emitting laser light. The emission part 322a lies at an end of the active layer 322. The surface 302c thus corresponds to the emitting end face according to the present invention. The top surface 302a and the bottom surface 302b each have an area greater than that of the emitting end face 302c.

The laser diode 302 is fixed to the slider 201 such that the bottom surface 302b lying at an end in the direction perpendicular to the plane of the active layer 322 faces the top surface 201c of the slider 201. In the present embodiment, in particular, the bottom surface 302b of the laser diode 302 is joined to the top surface 201c of the slider 201. For example, an adhesive is used to join the bottom surface 302b of the laser diode 302 to the top surface 201c of the slider 201.

The slider 201 may include a conductor layer that is arranged to be exposed in the top surface 201c and connects the p-electrode 314 of the laser diode 302 to one of the terminals 210. Here, the p-electrode 314 may be electrically connected to the conductor layer by joining the bottom surface 302b of the laser diode 302 to the top surface 201c of the slider 201. In such a case, the bottom surface 302b of the laser diode 302 and the conductor layer are connected to each other by soldering, for example. The n-electrode 313 of the laser diode 302 is connected to another one of the terminals 210 with a bonding wire, for example.

In the present embodiment, as shown in FIG. 27 and FIG. 28, the distance D3 between the bottom surface 302b and the emission part 322a of the laser diode 302 is smaller than the distance D4 between the top surface 302a and the emission part 322a of the laser diode 302.

The external mirror 303 has a reflecting part 303a and to-be-fixed parts 303b and 303c, each of which has a plate-like shape. The to-be-fixed parts 303b and 303c are coupled to each other to form an angle of 90° therebetween. The reflecting part 303a is coupled to an end of the to-be-fixed part 303c so as to form an angle of 135° with respect to the to-be-fixed part 303c. The to-be-fixed part 303b is coupled to the opposite end of the to-be-fixed part 303c. The to-be-fixed part 303b is fixed to the top surface 302a while the to-be-fixed part 303c is fixed to the emitting end face 302c, whereby the external mirror 303 is fixed to the laser diode 302. The reflecting part 303a is located in front of the emission part 322a. One of the surfaces of the reflecting part 303a that is closer to the emission part 322a constitutes a reflecting surface for reflecting the laser light emitted from the emission part 322a toward the waveguide 26 in the slider 201. The normal to the reflecting surface forms an angle of 45° with respect to the direction of travel of the laser light emitted from the emission part 322a.

The external mirror 303 can be formed by, for example, molding a body out of an insulating material such as resin or glass, and forming a metal film on at least a part of the body that is to make the reflecting surface by vapor deposition, sputtering, or the like. The part of the body that is to make the reflecting surface may be polished before the formation of the metal film. It is thereby possible to prevent the reflecting surface from being rounded at the portion near the border between the reflecting part 303a and the to-be-fixed part 303c. This provides the following effect. The laser light emitted from the emission part 322a increases in diameter with increasing distance from the emission part 332a. Thus, the longer the path of the laser light from the emission part 322a to the reflecting surface of the reflecting part 303a, the larger the diameter of the laser light reflected by the reflecting surface. As described above, if the part of the body to make the reflecting surface is polished before forming the metal film so as to prevent the reflecting surface from being rounded at the portion near the border between the reflecting part 303a and the to-be-fixed part 303c, it becomes possible that the laser light emitted from the emission part 322a is reflected by the reflecting surface at a point closer to the border between the reflecting part 303a and the to-be-fixed part 303c. Consequently, the path of the laser light from the emission part 322a to the reflecting surface can be reduced to prevent the diameter of the laser light reflected by the reflecting surface from being too large.

In the present embodiment, the laser light emitted from the emission part 322a of the laser diode 302 is reflected at the reflecting surface of the reflecting part 303a of the external mirror 302, passes through the clad layer 29, and enters the waveguide 26 from the top surface 26c to reach the rear end face 26b. The laser light is then reflected by the internal mirror 35 so as to travel through the waveguide 26 toward the medium facing surface 201a (front end face 26a).

As mentioned previously, the laser light emitted from the emission part 322a of the laser diode 302 increases in diameter with increasing distance from the emission part 332a. If the path of the laser light from the emission part 322a to the internal mirror 35 is too long, part of the laser light might thus fail to be incident on the internal mirror 35, causing a drop in the amount of the laser light that propagates through the waveguide 26.

In the present embodiment, the distance D3 between the bottom surface 302b and the emission part 322a of the laser diode 302 is smaller than the distance D4 between the top surface 302a and the emission part 322a of the laser diode 302. According to the present embodiment, the path of the laser light from the emission part 322a to the internal mirror 35 can thus be made smaller than the path of the laser light from the emission part 222a to the internal mirror 35 in the first embodiment. According to the present embodiment, it is therefore possible to make the diameter of the laser light incident on the internal mirror 35 smaller than in the first embodiment. Consequently, according to the present embodiment, it is possible to prevent a drop in the amount of the laser light that propagates through the waveguide 26 due to the failure of incidence of part of the laser light on the internal mirror 35.

The remainder of configuration, function and effects of the present embodiment are similar to those of the first embodiment.

Fourth Embodiment

Figure 29:
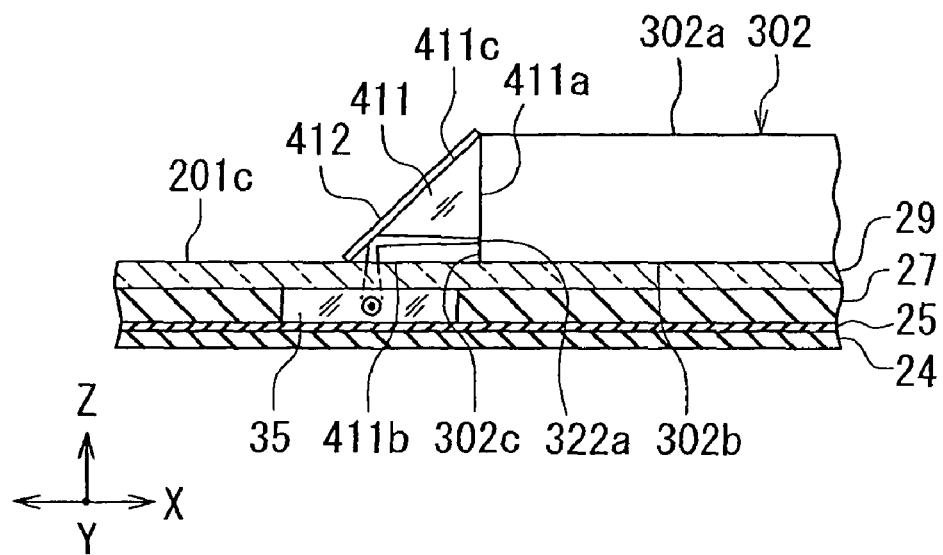
FIG. 29 is a cross-sectional view showing a laser diode, an external mirror and an internal mirror of a fourth embodiment of the invention.

A heat-assisted magnetic recording head according to a fourth embodiment of the present invention will now be described with reference to FIG. 29. FIG. 29 is a cross-sectional view showing a laser diode, an external mirror and an internal mirror of the present embodiment.

The heat-assisted magnetic recording head according to the present embodiment has a prism 411 and an external mirror 412 instead of the external mirror 303 of the third embodiment. The prism 411 is triangular-prism-shaped, having two orthogonal surfaces 411a and 411b, and a surface 411c which forms an angle of 45° with respect to each of the surfaces 411a and 411b. The external mirror 412 is joined to the surface 411c of the prism 411. The prism 411 is made of a material that transmits laser light, such as glass or crystals. The external mirror 412 is made of, for example, a metal film that is formed on the surface 411c by vapor deposition, sputtering, or the like. The surface 411a of the prism 411 is joined to the emitting end face 302c of the laser diode 302. The surface 411b of the prism 411 is joined to the top surface 201c of the slider 201.

In the present embodiment, the laser light emitted from the emission part 322a of the laser diode 302 enters the prism 411 from the surface 411a, reaches the surface 411c, and is reflected by the external mirror 412. The laser light reflected by the external mirror 412 is emitted out of the prism 411 from the surface 411b, passes through the clad layer 29, and enters the waveguide 26 from the top surface 26c to reach the rear end face 26b. The laser light is then reflected by the internal mirror 35 so as to travel through the waveguide 26 toward the medium facing surface 201a (front end face 26a).

The remainder of configuration, function and effects of the present embodiment are similar to those of the third embodiment.

Fifth Embodiment

Figure 30:
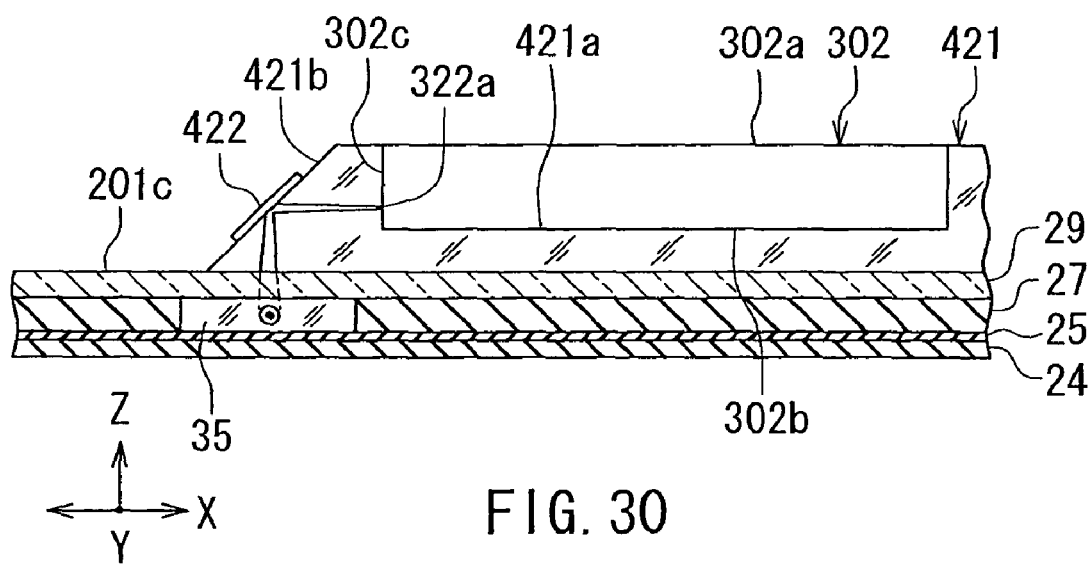
FIG. 30 is a cross-sectional view showing a laser diode, an external mirror and an internal mirror of a fifth embodiment of the invention.

A heat-assisted magnetic recording head according to a fifth embodiment of the present invention will now be described with reference to FIG. 30. FIG. 30 is a cross-sectional view showing a laser diode, an external mirror and an internal mirror of the present embodiment.

The heat-assisted magnetic recording head according to the present embodiment has a laser holding member 421 and an external mirror 422 instead of the external mirror 303 of the third embodiment. The laser holding member 421 is joined to the top surface 201c of the slider 201. The laser holding member 421 has a recess 421a for accommodating the laser diode 302. The laser diode 302 is accommodated in the recess 421a such that the bottom surface 302b faces toward the top surface 201c of the slider 201 and is parallel to the top surface 201c.

The laser holding member 421 has an oblique surface 421b that is located in front of the emission part 322a of the laser diode 302. The oblique surface 421b forms an angle of 45° with respect to each of the emitting end face 302c of the laser diode 302 and the top surface 201c of the slider 201. The external mirror 422 is joined to the oblique surface 421b.

The laser holding member 421 is made of a material that transmits laser light, such as glass or crystals. The external mirror 422 is made of, for example, a metal film that is formed on the surface 421b by vapor deposition, sputtering, or the like.

In the present embodiment, the laser light passes through the inside of the laser holding member 421 to reach the oblique surface 421b, and is reflected by the external mirror 422. The laser light reflected by the external mirror 422 is emitted out of the laser holding member 421, passes through the clad layer 29, and enters the waveguide 26 from the top surface 26c to reach the rear end face 26b. The laser light is then reflected by the internal mirror 35 so as to travel through the waveguide 26 toward the medium facing surface 201a (front end face 26a).

The remainder of configuration, function and effects of the present embodiment are similar to those of the third embodiment.

Sixth Embodiment

Figure 31:
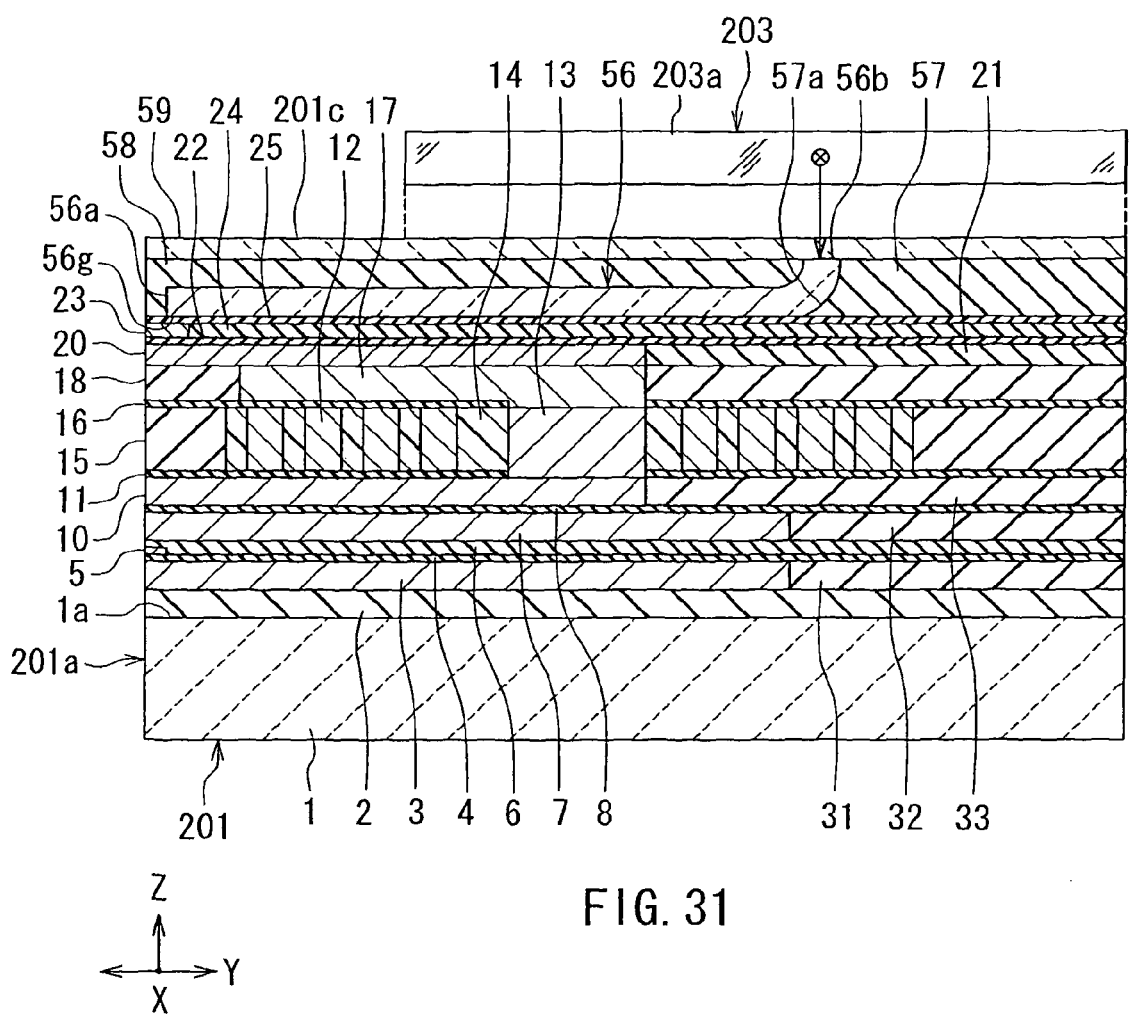
FIG. 31 is a cross-sectional view showing a heat-assisted magnetic recording head according to a sixth embodiment of the invention.

A heat-assisted magnetic recording head according to a sixth embodiment of the present invention will now be described with reference to FIG. 31. FIG. 31 is a cross-sectional view of the heat-assisted magnetic recording head according to the present embodiment. The slider 201 of the heat-assisted magnetic recording head according to the present embodiment has a waveguide 56 and clad layers 57, 58 and 59 instead of the waveguide 26, the clad layers 27, 28 and 29 and the internal mirror 35 of the first embodiment.

The waveguide 56 is disposed on the interposition layer 25. The waveguide 56, except a portion in the vicinity of the end farther from the medium facing surface 201a, has the same shape as that of the waveguide 26. The portion of the waveguide 56 in the vicinity of the end farther from the medium facing surface 201a is bent to get closer to the top surface 201c of the slider 201 with increasing distance from the medium facing surface 201a. The waveguide 56 has an outer surface. The outer surface includes: a front end face 56a that is closer to the medium facing surface 201a; an incident end face 56b opposite to the front end face 56a; a top surface that is farther from the top surface 1a of the substrate 1; a bottom surface that is closer to the top surface 1a of the substrate 1; and two side surfaces that are opposite to each other in the track width direction. In each of the top surface, the bottom surface and the two side surfaces of the waveguide 56, the portion in the vicinity of the end farther from the medium facing surface 201a is bent to get closer to the top surface 201c of the slider 201 with increasing distance from the medium facing surface 201a. The incident end face 56b is parallel to the top surface 1a of the substrate 1 and faces upward. The laser light reflected by the external mirror 203 is to be incident on this incident end face 56b. FIG. 31 shows an example where the front end face 56a is located away from the medium facing surface 201a. The front end face 56a may be located in the medium facing surface 201a, however.

The clad layer 57 is disposed farther from the medium facing surface 201a than is the waveguide 56. The clad layer 57 has an end face 57a that is curved and is in contact with the waveguide 56. The clad layer 58 is disposed to cover the waveguide 56 excluding its bottom surface and incident end face 56b. The incident end face 56b and the top surfaces of the clad layers 57 and 58 are flattened. The clad layer 59 is disposed over the incident end face 56b and the top surfaces of the clad layers 57 and 58. The top surface of the clad layer 59 constitutes the top surface 201c of the slider 201.

The outer surface of the waveguide 56 includes an opposed portion 56g that is opposed to a part of the coupling portion of the outer surface of the near-field light generating element 23. In the present embodiment, as shown in FIG. 31, the waveguide 56 is disposed farther from the top surface 1a of the substrate 1 than is the near-field light generating element 23, and a part of the bottom surface of the waveguide 56 is opposed to a part of the top surface 23c of the near-field light generating element 23 with the interposition layer 25 interposed therebetween. This part of the bottom surface of the waveguide 56 opposed to the part of the top surface 23c is the opposed portion 56g.

Each of the clad layers 57, 58 and 59 has a refractive index lower than that of the waveguide 56. The material of the waveguide 56 is the same as that of the waveguide 26 of the first embodiment. The materials of the clad layers 57, 58 and 59 are the same as those of the clad layers 27, 28 and 29 of the first embodiment.

Figure 32:
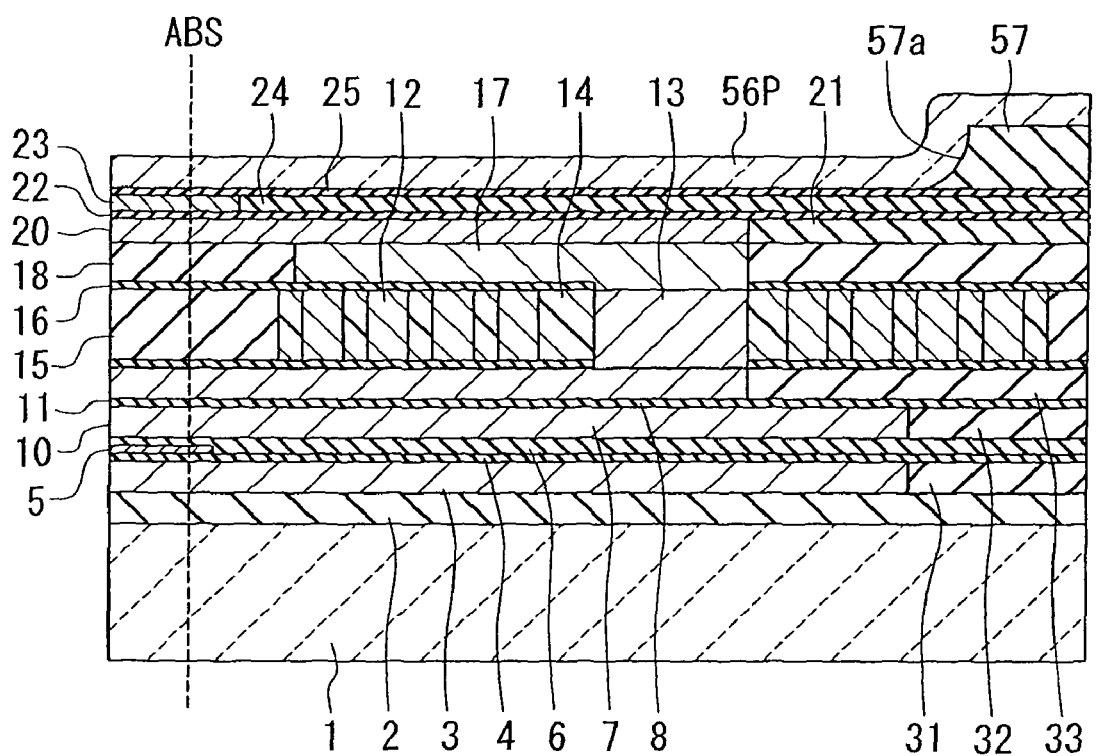
FIG. 32 is an explanatory diagram showing a step of a method of manufacturing the heat-assisted magnetic recording head according to the sixth embodiment of the invention.
Figure 33:
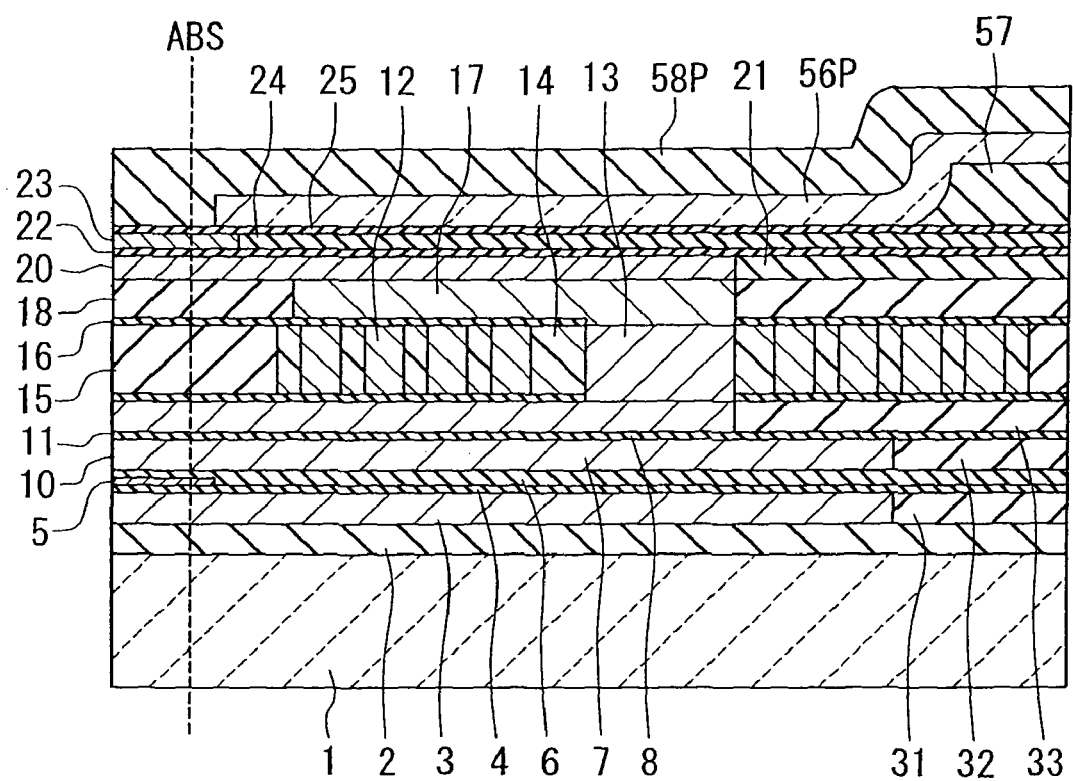
FIG. 33 is an explanatory diagram showing a step that follows the step of FIG. 32.
Figure 34:
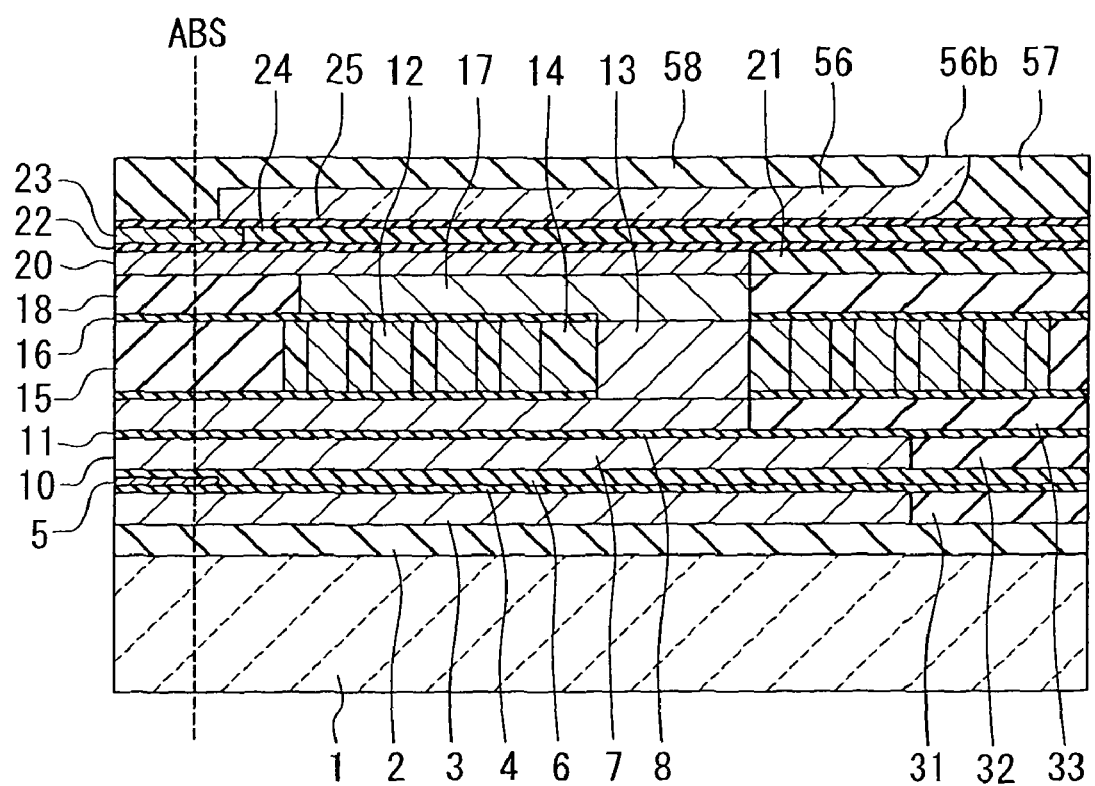
FIG. 34 is an explanatory diagram showing a step that follows the step of FIG. 33.

Reference is now made to FIG. 32 to FIG. 34 to describe a method of manufacturing the heat-assisted magnetic recording head according to the present embodiment. FIG. 32 to FIG. 34 each show a cross section of a stack of layers formed in the process of manufacturing the heat-assisted magnetic recording head, the cross section being perpendicular to the medium facing surface and the substrate. In FIG. 32 to FIG. 34 the symbol "ABS" indicates the position where the medium facing surface 201a is to be formed.

The method of manufacturing the heat-assisted magnetic recording head 200 according to the present embodiment is the same as that of the first embodiment up to the step of forming the interposition layer 25. FIG. 32 shows the next step. In this step, first, a not-shown dielectric layer that is to make the clad layer 57 afterward is formed on the interposition layer 25. On this dielectric layer, a not-shown metal mask having a plane shape corresponding to that of the clad layer 57 is formed. The dielectric layer is then selectively etched by, for example, RIE, whereby the clad layer 57 is formed. The end face 57a of the clad layer 57 is formed at this time. Next, a dielectric layer 56P, which is to make the waveguide 56 afterward, is formed over the entire top surface of the stack.

FIG. 33 shows the next step. In this step, first, the dielectric layer 56P is selectively etched by RIE, for example, so that the dielectric layer 56P will have surfaces that respectively correspond to the front end face 56a and the two side surfaces of the waveguide 56. Next, a dielectric layer 58P, which is to make the clad layer 58 afterward, is formed over the entire top surface of the stack.

FIG. 34 shows the next step. In this step, the dielectric layers 58P and 56P are polished by, for example, CMP until the clad layer 57 is exposed. The dielectric layer 56P remaining after the polishing makes the waveguide 56, and the clad layer 58P remaining after the polishing makes the clad layer 58. This polishing also forms the incident end face 56b and flattens the incident end face 56b and the top surfaces of the clad layers 57 and 58.

Next, the clad layer 59 shown in FIG. 31 is formed over the entire top surface of the stack. Wiring, the terminals 210 and so on are then formed on the top surface of the clad layer 59. Next, the laser diode 202 with the external mirror 203 fixed thereto is fixed to the top surface of the clad layer 59. The substrate is then cut into sliders, and polishing of the medium facing surface 201a, fabrication of flying rails, etc. are performed to thereby complete the heat-assisted magnetic recording head.

In the present embodiment, the laser light emitted from the emission part 222a of the laser diode 202 is reflected at the reflecting surface of the reflecting part 203a of the external mirror 203, passes through the clad layer 59, and enters the waveguide 56 from the incident end face 56b. Entering the waveguide 56, the laser light is reflected at the interface between the waveguide 56 and each of the clad layers 57 and 58 while traveling through the waveguide 56 toward the medium facing surface 201a (front end face 56a).

The remainder of configuration, function and effects of the present embodiment are similar to those of the first embodiment.

It should be appreciated that the present invention is not limited to the foregoing embodiments, and various modifications may be made thereto. For example, in the first to fifth embodiments, the internal mirror 35 may be replaced with a diffraction grating that diffracts the laser light entering the waveguide 26 from the top surface 26c, so as to let the laser light travel through the waveguide 26 toward the medium facing surface 201a.

In the third to fifth embodiments, the laser diode 302, the external mirror 303, 412 or 422, the internal mirror 35 and the waveguide 26 may be arranged so that the direction of travel of the laser light emitted from the emission part 322a of the laser diode 302 and the direction of travel of the laser light reflected by the internal mirror 35 are parallel to each other, as in the second embodiment.

In the sixth embodiment, the laser diode 202 and the external mirror 203 may be replaced with the laser diode 302 and the external mirror 303, 412 or 422 in any of the third to fifth embodiments. In addition, in the sixth embodiment, the laser diode and the external mirror may be arranged so that the laser light emitted from the emission part of the laser diode travels in the Y direction as in the second embodiment.

In the present invention, the near-field light generating element 23 may have a shape other than the shapes shown in FIG. 9 and FIG. 21.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A heat-assisted magnetic recording head comprising a slider, an edge-emitting laser diode fixed to the slider, and an external mirror provided outside the slider,
    the slider comprising:
    a medium facing surface that faces a recording medium;
    a magnetic pole that has an end face located in the medium facing surface, for producing a recording magnetic field for recording data on the recording medium;
    a waveguide that allows light to propagate therethrough;
    a near-field light generating element having a near-field light generating part located in the medium facing surface, a surface plasmon being excited based on the light propagating through the waveguide, the surface plasmon propagating to the near-field light generating part, the near-field light generating part generating near-field light based on the surface plasmon; and
    a substrate on which the magnetic pole, the near-field light generating element and the waveguide are stacked, wherein:
    the substrate has a top surface facing toward the magnetic pole, the near-field light generating element and the waveguide;
    the slider has a top surface that lies above the top surface of the substrate;
    the near-field light generating element and the waveguide are disposed farther from the top surface of the substrate than is the magnetic pole;
    the laser diode includes: an active layer; an emitting end face that lies at an end in a direction parallel to a plane of the active layer and includes an emission part for emitting laser light; and a bottom surface that lies at an end in a direction perpendicular to the plane of the active layer, the laser diode being arranged so that the bottom surface faces the top surface of the slider; and
    the external mirror reflects the laser light emitted from the emission part toward the waveguide.

2. The heat-assisted magnetic recording head according to claim 1, wherein the waveguide is disposed farther from the top surface of the substrate than is the near-field light generating element.

3. The heat-assisted magnetic recording head according to claim 1, wherein:
    the near-field light generating element has an outer surface, the outer surface including: a first end face that is located in the medium facing surface; a second end face that is spaced from the medium facing surface; and a coupling portion that couples the first end face and the second end face to each other, the first end face including the near-field light generating part;
    a length of the near-field light generating element in a direction perpendicular to the medium facing surface is greater than a length of the first end face in a direction perpendicular to the top surface of the substrate; and
    the waveguide has an outer surface including an opposed portion that is opposed to a part of the coupling portion.

4. The heat-assisted magnetic recording head according to claim 3, wherein the slider further comprises an interposition layer that has a refractive index lower than that of the waveguide and is interposed between the opposed portion and the near-field light generating element.

5. The heat-assisted magnetic recording head according to claim 1, wherein the slider further comprises an internal mirror that reflects the laser light emitted from the emission part and reflected by the external mirror, so as to let the laser light travel through the waveguide toward the medium facing surface.

6. The heat-assisted magnetic recording head according to claim 5, wherein the laser diode, the external mirror, the internal mirror and the waveguide are arranged so that a direction of travel of the laser light emitted from the emission part and a direction of travel of the laser light reflected by the internal mirror are orthogonal to each other as viewed from above the top surface of the slider.

7. The heat-assisted magnetic recording head according to claim 5, wherein the laser diode, the external mirror, the internal mirror and the waveguide are arranged so that a direction of travel of the laser light emitted from the emission part and a direction of travel of the laser light reflected by the internal mirror are parallel to each other.

8. The heat-assisted magnetic recording head according to claim 1, wherein the waveguide has an incident end face on which the laser light reflected by the external mirror is to be incident.

9. The heat-assisted magnetic recording head according to claim 1, wherein the laser diode has a top surface opposite to the bottom surface, and a distance between the bottom surface and the emission part is smaller than a distance between the top surface of the laser diode and the emission part.

10. The heat-assisted magnetic recording head according to claim 1, wherein no magnetic layer is present between the waveguide and the top surface of the slider.

* * * * *